United States Patent [19]
Suzuki

[11] Patent Number: 5,093,818
[45] Date of Patent: Mar. 3, 1992

[54] DISK CARTRIDGE FOR DISK PLAYER WITH INTEGRATED DISK CHANGER

[75] Inventor: Shoji Suzuki, Iwaki, Japan

[73] Assignee: Alpine Electronics Inc., Tokyo, Japan

[21] Appl. No.: 411,445

[22] Filed: Sep. 22, 1989

[30] Foreign Application Priority Data

| Aug. 29, 1988 | [JP] | Japan | 63-127618[U] |
|---|---|---|---|
| Sep. 22, 1988 | [JP] | Japan | 63-239396 |
| Sep. 22, 1988 | [JP] | Japan | 63-239397 |
| Sep. 26, 1988 | [JP] | Japan | 63-241898 |
| Sep. 26, 1988 | [JP] | Japan | 63-241899 |
| Sep. 26, 1988 | [JP] | Japan | 63-241900 |
| Sep. 29, 1988 | [JP] | Japan | 63-127617[U] |

[51] Int. Cl.⁵ .............. G11B 17/04; G11B 17/22; G11B 17/26
[52] U.S. Cl. ........................ 369/36; 369/34
[58] Field of Search .......... 369/34, 35, 36, 38, 369/39, 77.1, 77.2, 75.2; 360/99.02, 99.03, 99.06

[56] References Cited

U.S. PATENT DOCUMENTS

| 4,507,768 | 3/1985 | Ikedo et al. | 369/77.1 |
| 4,616,357 | 10/1986 | Nakayama | 369/75.2 X |
| 4,701,900 | 10/1987 | Hasegawa et al. | 369/38 X |
| 4,737,945 | 4/1988 | Yamazaki et al. | 369/36 |
| 4,788,673 | 11/1988 | Ikedo et al. | 369/36 |

FOREIGN PATENT DOCUMENTS

| 0143554A1 | 6/1985 | European Pat. Off. |
| 0177232A2 | 4/1986 | European Pat. Off. |
| A20225766 | 6/1987 | European Pat. Off. |
| 0355011A2 | 2/1990 | European Pat. Off. |
| 2164781A | 3/1986 | United Kingdom |
| 2160349A | 9/1987 | United Kingdom |

Primary Examiner—Stuart S. Levy
Assistant Examiner—Kenneth B. Wells
Attorney, Agent, or Firm—Guy W. Shoup; B. Noël Kivlin

[57] ABSTRACT

A disk cartridge for use with a disk changer wherein various internal members can be assembled by a minimal number of screws or like fasteners, and with a minimal size and thickness, and a disk player with an integrated disk changer wherein an end of a disk drawn in by a drawing-in mechanism does not collide with any member such as a clamper, and a guide need not be moved away when a disk is moved to a position at which it is to be clamped by the clamper. The disk cartridge includes several partition plates each having a pair of spacers formed on the opposite sides thereof and placed one on another to define several disk receiving slits, and a pair of spring plates for resiliently pressing disks in the slits in suitable directions. The disk cartridge is handled on the disk player by a disk discharging device which employs a power converting device, a disk loading device, a disk clamping device and a cartridge ejecting device, all of which are improved.

15 Claims, 16 Drawing Sheets

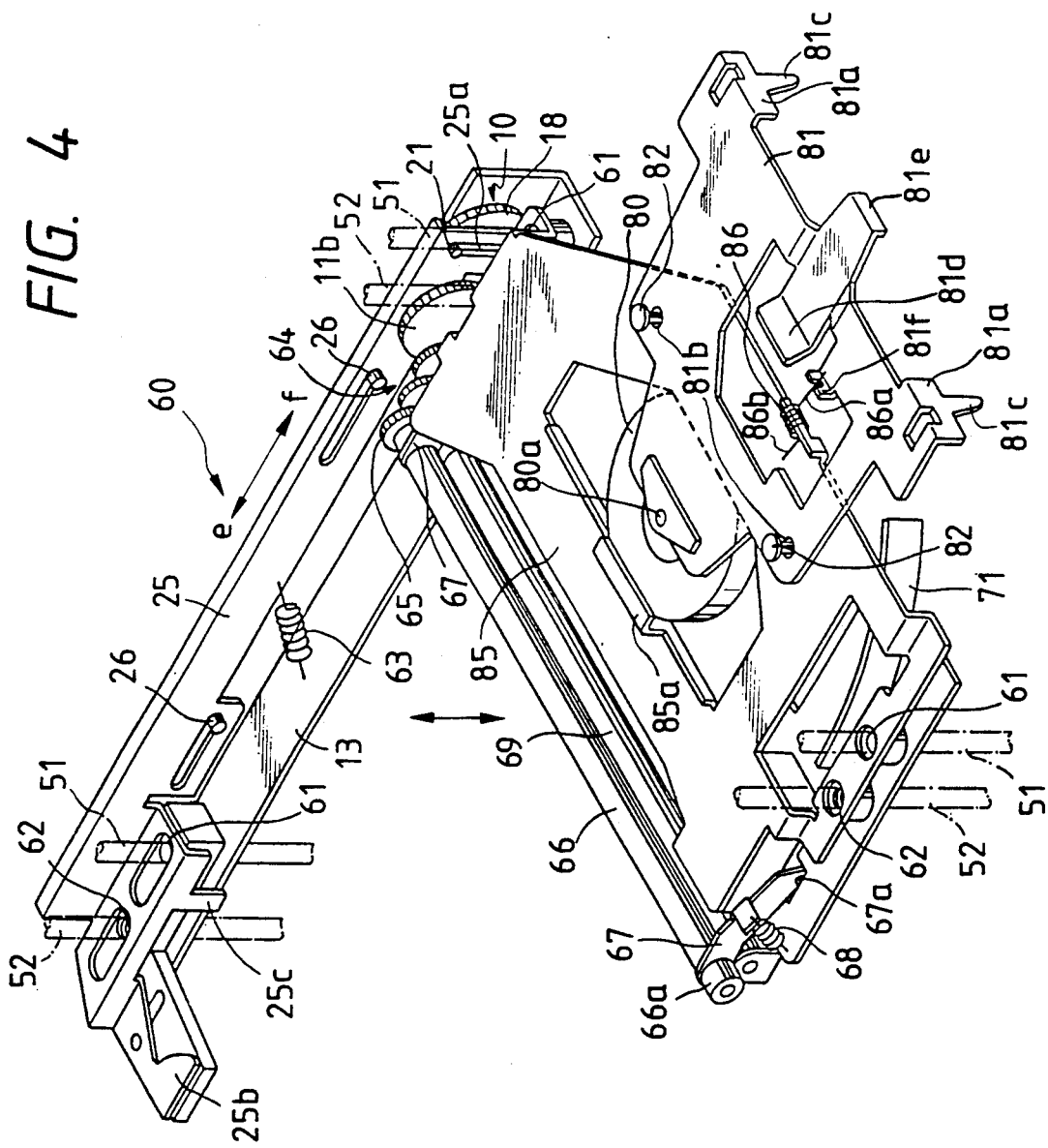

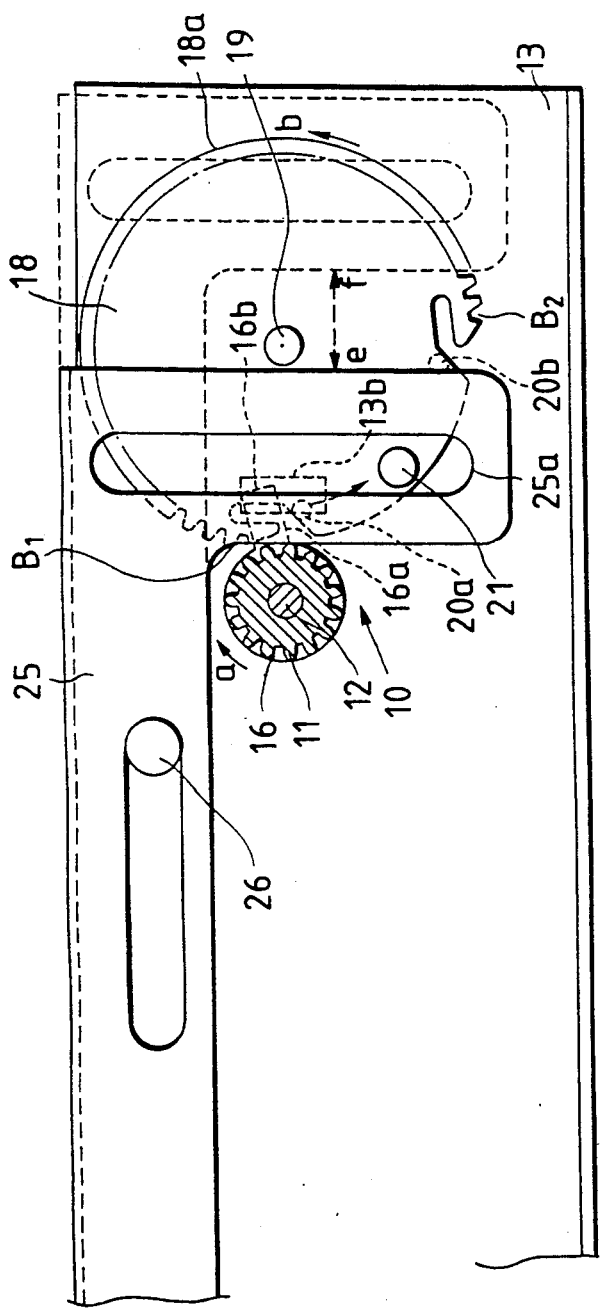
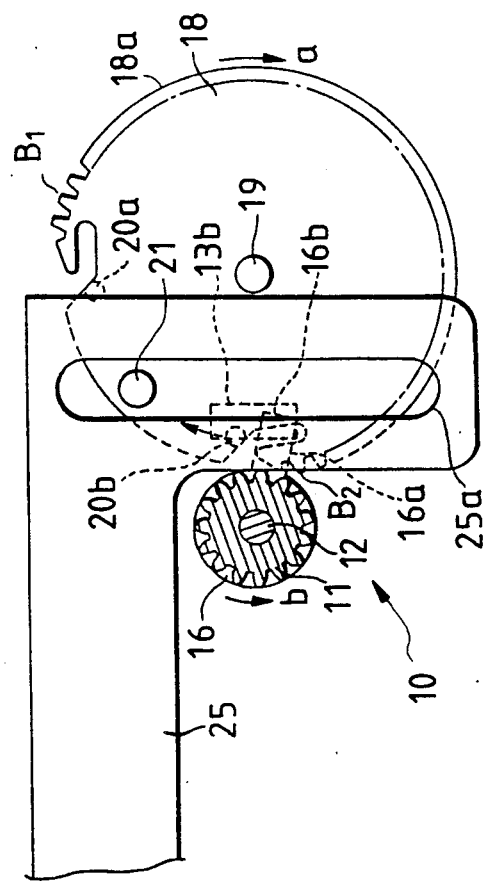
FIG. 5A
FIG. 5B

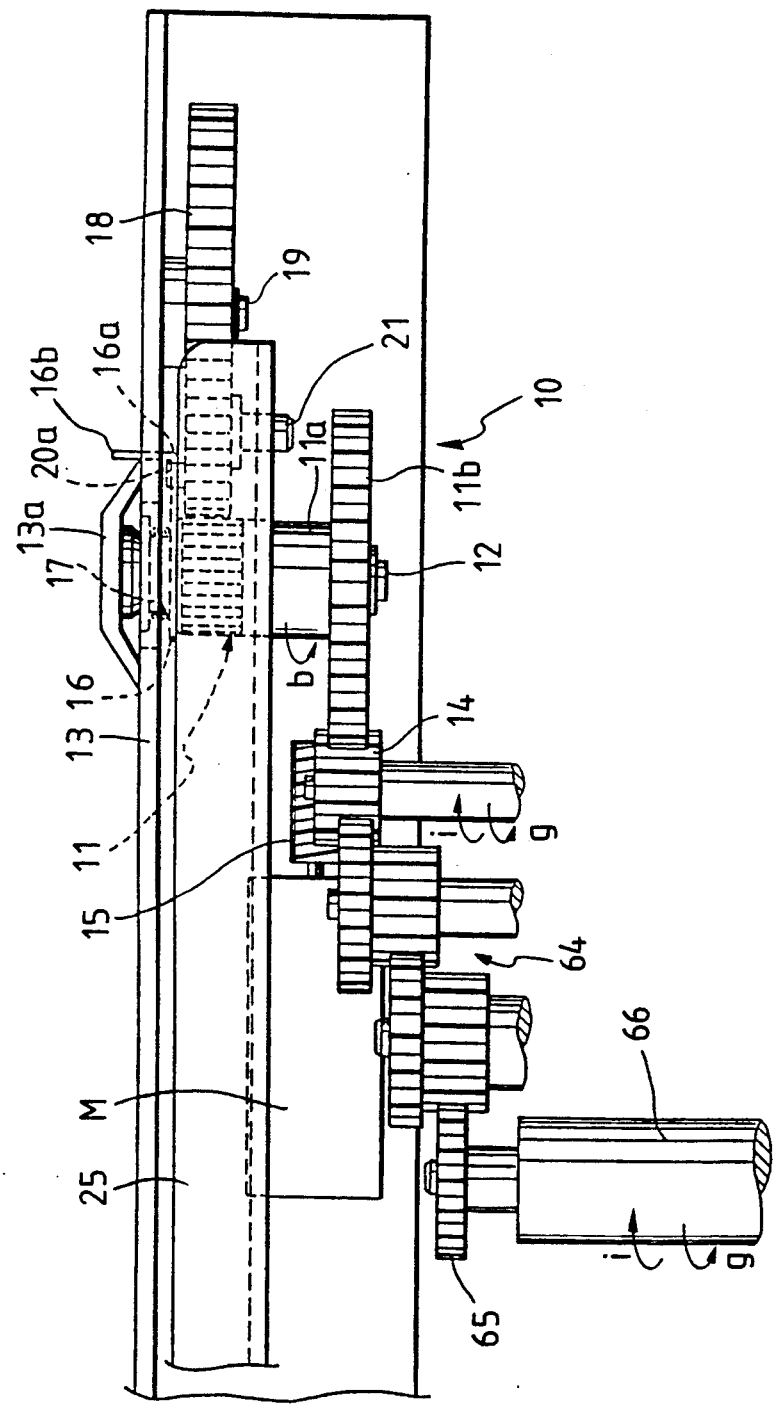

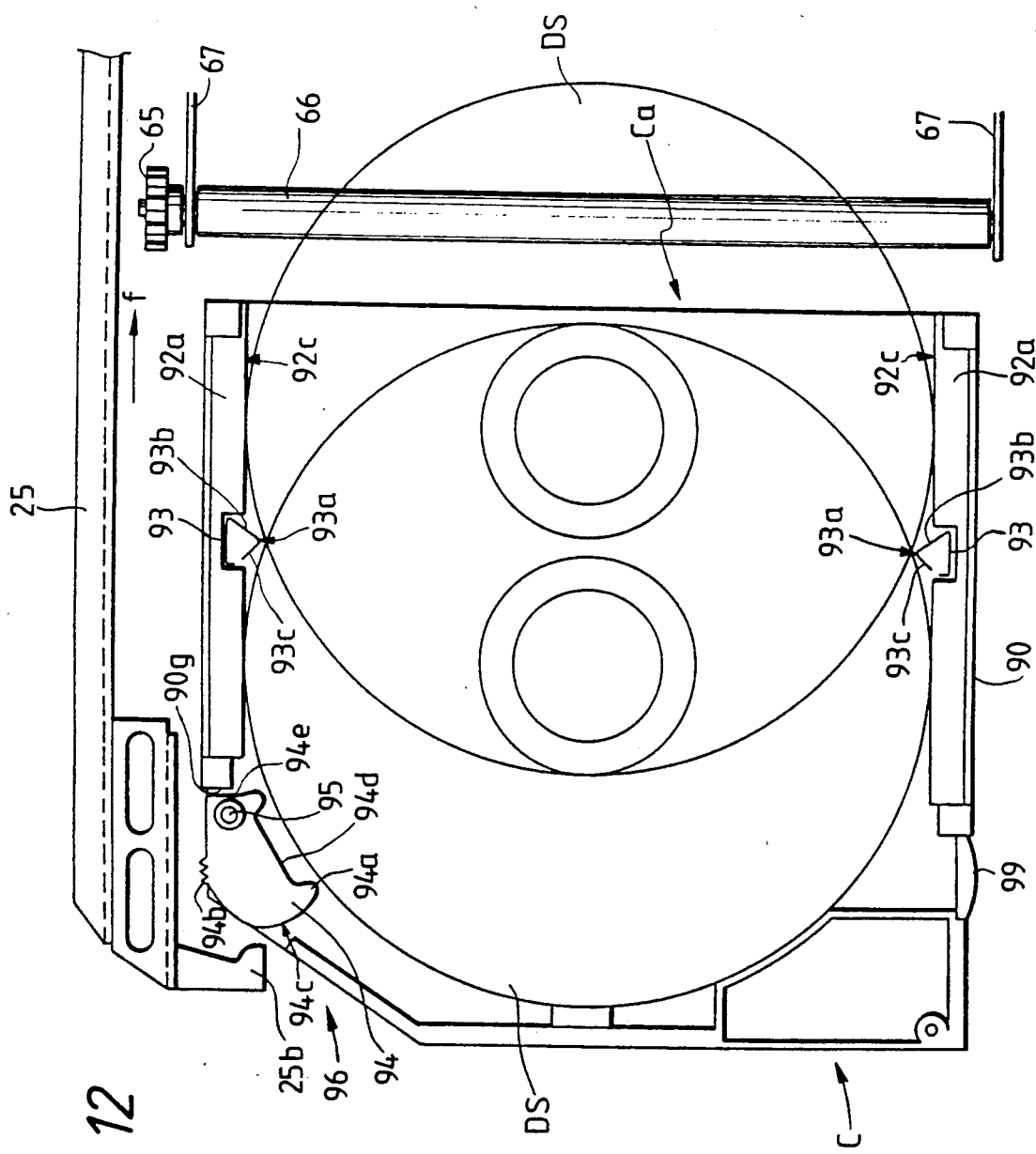

DISK CARTRIDGE FOR DISK PLAYER WITH INTEGRATED DISK CHANGER

BACKGROUND OF THE INVENTION

1. Field of the Invention

This invention relates to a disk changer wherein one of a plurality of disks is selectively loaded in position at a disk playing section, and more particularly to a cartridge in which a plurality of disks are accommodated, a disk discharging device for discharging a disk from a cartridge, a disk clamping device for clamping a disk discharged from a disk discharging device on a turntable, and a cartridge ejecting device for discharging a cartridge from its inserted position.

2. Description of the Prior Art

Recently, a disk player integrated with a disk changer has been put to practical use for a car audio system.

A disk cartridge, such as, for example, a disk cartridge DC shown in FIG. 16, is used with a disk changer-integrated disk player of the type mentioned. Such a disk cartridge DC has a plurality of disks DS accommodated therein. After the disk cartridge DC is loaded in position, the disks DS are searched by a lifting section 200 so that a particular one of the disks DS is drawn out of the disk cartridge DC by means of a pair of drawing-out rollers 201A and 201b. The lifting section 200 includes a disk clamping mechanism including a clamper 202 and a clamp arm 203 pivotable on an axis 203a for supporting the clamper 202 for rotation thereon, and a disk supporting table 207.

A disk drive unit is located below the lifting section 200. The disk drive unit includes a turntable 204 connected to be driven by a motor (not shown) to rotate a disk DS placed on the turntable 204, and an optical pickup 205 mounted in an opposing relationship to a disk DS placed on the turntable 204 for reproducing information from the disk DS.

After the disk DS is drawn out from a disk cartridge DC by the drawing-out rollers 201a and 201b, the lifting section 200 carrying the disk DS thereon is moved down to place the disk DS onto the turntable 204, and then the disk DS is clamped on the turntable 204 by the clamper 202. After then, the disk DS is driven to rotate on the turntable 204, and information is reproduced by the disk DS by the optical pickup 205.

Further, in a disk changer of the type described above, a cartridge DC must necessarily be discharged from a cartridge loading section of the disk changer before a new disk cartridge DC is loaded in place of the former cartridge DC. To this end, a disk ejecting device is provided. A conventional disk ejecting device is constituted such that a lever is provided for urging a disk cartridge in a discharging direction and, if a disk cartridge is inserted to a predetermined operative position against the urging force of a spring or the like acting on the lever, the cartridge itself or the lever is locked in position. Then, when the cartridge DC is to be discharged for replacement thereof, such locked condition is cancelled by operation of a solenoid for the ejecting operation. Consequently, the lever is pushed out toward a disk insertion opening by the urging force of the spring to discharge the disk cartridge DC.

A disk cartridge to be loaded into a disk changer-integrated disk player of the type described above may have various structures. An exemplary structure includes a plurality of pivotal trays located in a disk cartridge, each tray having a disk carried thereon. After a disk cartridge of the type is loaded in position into a disk changer, one of the trays on which a disk to be reproduced is carried is pivoted and projected outwardly from the cartridge. Then, a disk drive unit including a turntable and an optical pickup is moved to the position of the thus projected tray to play the disk.

With the disk cartridge of the structure described just above, the locus of a tray when it is pivoted outwardly from the disk cartridge is projected to the outside of the cartridge. Accordingly, an excessively large amount of space is required. Further, since a disk drive unit including a turntable and an optical pickup must be lifted to the position of a tray, a lifting section within the apparatus is heavy, and accordingly, a lifting driving mechanism must have correspondingly great lifting force.

To the contrary, the disk cartridge DC of the structure shown in FIG. 16 wherein a disk DS is drawn out horizontally from within the disk cartridge DC requires no provision of space for pivotal motion of a tray, which is advantageous in conserving space. Further, since the disk drive unit including the turntable 204 and the optical pickup 205 may be located just below the lifting section 200, there are the advantages that the playing operation of the disk drive unit can be easily stabilized and that the weight of the lifting section can be reduced.

With the disk cartridge DC having a structure wherein a disk DS is drawn out in a horizontal orientation therefrom, however, a spring mechanism for retaining a disk DS within the cartridge DC, an ejector for pushing out a disk DS toward the drawing-out rollers 201a and 201b, a partition plate for partitioning a drive accommodating section and so on must be provided in a fixed relationship to each other. Accordingly, mounting structures for such various members within the disk cartridge are complicated, and an increase in the thickness and overall size of the cartridge results.

Meanwhile, with a disk player of the type described above, a disk DS is nipped by the drawing-in rollers 201a and 201b being rotated and is introduced into the lifting section 200. In this instance, if the disk DS should shake or sway, then an end thereof might possibly abut the clamper 202 or some other member to prevent the disk DS from being loaded in position. Thus, another guide roller (not shown) is conventionally provided at a location interior to the drawing-in roller 201a so as to guide a disk DS so that an end thereof may not be lifted in order to prevent the disk DS from abutting the clamper 202 or some other member.

However, with the disk changer-integrated disk player shown in FIG. 16, after a disk DS is introduced into the lifting section 200, the lifting section 200 is moved down to the disk playing section at which the turntable 204 and so on are located so that the disk DS is placed onto the turntable 204. Before the lifting section 200 is lowered, however, the drawing-out roller 201a must necessarily be moved to a position at which it will not abut the disk DS. In addition, it is also necessary to move the guide roller 201b away together with the drawing-out roller 201a, and a mechanism for moving the rollers 201a and 201b away at the same time must be provided. Consequently, the mechanism in the lifting section 200 is made more complex.

Besides, since the guide roller 201b extends over the entire length in the lifting section 200 in the direction perpendicular to the plane of FIG. 16, the space in the lifting section 200 is restricted due to the provision of the guide roller 201b, which makes arrangement of other parts difficult.

SUMMARY OF THE INVENTION

It is an object of the present invention to provide a disk cartridge for use with a disk changer wherein various internal members can be assembled by means of a minimal number of screws or like means, and has a minimal size and thickness.

It is another object of the present invention to provide a disk player with an integrated disk changer wherein an end of a disk drawn in by a drawing-in mechanism does not collide with any member such as a clamper, and a guide need not be moved away when a disk is moved to a position at which it is to be clamped by the clamper.

In order to attain these objects, according to one aspect of the present invention, a disk cartridge is provided for use with a disk changer. The disk cartridge comprises a case in which a plurality of disk receiving slits for receiving disks therein are formed, the case having an insertion/discharging opening formed therein for admitting or discharging a disk into or from the case, spring means for retaining disks received in the disk receiving slits individually in their accommodated positions, and a plurality of ejectors individually provided for the disk receiving slits at a location of the case remote from the insertion/discharging opening and each supported at one end thereof for individual pivotal motion around a shaft each for pushing out a disk from within a corresponding one of the disk receiving slits toward the insertion/discharging opening, each of the ejectors having a pressure receiving portion on an outer edge thereof which extends along an outer face of the case, each of the ejectors further having a pressing portion formed on an inner edge thereof for pushing a disk received in a corresponding one of the disk receiving slits toward the insertion/discharging opening.

With the disk cartridge according to the present invention, disks inserted in the disk receiving slits formed in the case are retained in the case by the spring means. Further, each of the ejectors is supported at one end thereof for pivotal motion by means of the shaft, and each of the ejectors has a pressure receiving portion on the outer edge thereof which extends along the outer face of the case. If the pressure receiving portion of one of the ejectors is pushed inwardly into the case, then the pressing portion formed on the inner edge of the ejector pushes the corresponding disk toward the insertion/discharging opening of the case so that the disk is discharged from the insertion/discharging opening. Accordingly, for a disk changer into which the disk cartridge is to be loaded, a disk can be discharged from the disk cartridge only by applying a pressing force to the corresponding ejector. Accordingly, operation of a disk discharging member of a disk changer is simplified. Meanwhile, when the disks in the disk cartridge are to be exchanged after the disk cartridge is removed from the disk changer, a disk can be discharged only by pushing the corresponding ejector with a finger. Besides, since each of the ejectors has a simple configuration so that the outer edge thereof extends along the outer face of the case and the pressing portion is formed on the inner edge thereof, the space required for installation of the ejectors is very small and accordingly the cartridge has a small overall size.

According to another aspect of the present invention, there is provided a disk cartridge for use with a disk changer wherein a plurality of disk receiving slits are formed in a case, comprising a plurality of partition plates for defining the disk receiving slits, a pair of spacers formed in an integral relationship on the opposite sides of each of the partition plates for assuring a distance between each adjacent ones of the partition plates, the pairs of spacers being placed on one another in the case to cause the partition plates to define the disk receiving slits therebetween, and a pair of spring plates located in the case at locations adjacent the opposite side portions of disks to be inserted into or discharged from the disk receiving slits, each of the spring plates having formed in an integral relationship thereon a pressing portion for pressing a disk in its insertion direction and another pressing portion for pressing a disk in its discharging direction, each of the spring plates being fitted in holes or recesses formed in the individual partition plates.

With the disk cartridge, since the partition plates are placed one on another in the case, the disk receiving slits are defined by and between the partition plates with the distance between adjacent ones of the partition plates assured by the spacers which are formed in an integral relationship on the opposite sides of the partition plates. Meanwhile, the spring plates are installed in position in the case only by inserting them into the holes or recesses formed in the individual partition plates. In this manner, the entire cartridge can be assembled without employing fixing means such as screws for the partition plates and the spring plates. Besides, since the disk cartridge has a minimal number of fixed portions, it has a reduced thickness and size. The spring plates are opposed to the opposite sides of a disk insertion path such that, when a disk is to be inserted, the disk is pushed in its insertion direction by one of a pair of pressing pieces provided on each of the spring plates to prevent the disk from unintentionally sliding out of the disk cartridge. To the contrary, when the disk is to be discharged, it is discharged positively by the other pressing piece of each of the spring plates.

According to a further aspect of the present invention, there is provided a disk player with an integrated disk changer, comprising a motor and a power converting device, the power converting device including a driving gear connected to be rotated by the motor, a change-over lever disposed in a coaxial relationship and in frictional engagement with the driving gear to pivot within a limited angular range following the driving gear, and a change-over gear disposed for meshing engagement with the driving gear, the change-over gear having a series of teeth formed over a predetermined angular range on an outer periphery thereof, the change-over gear further having a pair of pressure receiving projections provided at such locations thereon that, when an end of the series of teeth is brought out of meshing engagement with the driving gear, either one of the pressure receiving projections may be opposed to the change-over lever.

With the disk player with an integrated disk changer, if the driving gear of the power converting device is rotated in one of the opposite directions, the change-over lever is pivoted within the limited angular range following the driving gear. Upon such pivotal motion of the change-over lever, one of the pressure receiving projections of the change-over gear is pushed by the change-over lever to rotate the change-over gear to put the series of teeth of the change-over gear into meshing engagement with the driving gear. Consequently, the power of the driving gear is thereafter transmitted to the change-over gear. Since the power is transmitted directly from the driving gear to the change-over gear, an idle gear such as in a conventional disk player becomes unnecessary, and the change-over gear can be driven by a minimal number of gears. Accordingly, the disk player is simplified in structure. Also, since there is no need for an idle gear, the direction of rotation of the change-over gear can be made reverse to the direction of rotation of the driving gear, and accordingly, the turning forces of the opposite directions can be utilized as different driving sources.

The disk player may further comprise a cartridge loading section into which a disk cartridge in which a plurality of disk are accommodated is to be inserted, a disk drawing-out mechanism located in an opposing relationship to a disk discharging opening of a disk cartridge inserted in position in the cartridge loading section for drawing out a disk from within the cartridge, and a disk discharging member connected to be linearly moved back and forth by the change-over gear of the power converting device to push out a disk within the disk cartridge to the disk drawing out mechanism. With the disk player, since the disk discharging member is driven by the power converting device, a mechanism for discharging a disk can be constructed with a minimal number of components in a minimum space, and accordingly, a reduction in the overall side of the apparatus is attained.

According to a still further aspect of the present invention, there is provided a disk player with an integrated disk changer which includes a drawing-in roller connected to be driven by a motor to draw a disk in and a disk clamping mechanism located forward of the roller in the drawing-in direction, which comprises a pair of disk guides located on the same side as a clamper of the disk clamping mechanism between the drawing roller and the disk clamping mechanism such that they may guide the opposite end portions of a disk being drawn in by the drawing-in roller and then may be disengaged from the outer periphery of the disk when the disk comes to a position at which it can be clamped by the clamping mechanism.

With the disk player with an integrated disk changer, a disk being drawn in by the drawing-in roller is guided at the opposite end portions thereof by the disk guides so that it is prevented from shaking or swaying at an end thereof and will not abut a member of the disk player such as a clamper. To the contrary, when the disk is drawn in fully to the position at which it is to be clamped, the disk guides are disengaged from the outer periphery of the disk. Accordingly, when the disk is to be clamped on the turntable, the disk guides need not be moved to escape from the disk. Further, the disk guides can be installed in a smaller space than is a conventional guide roller, which is economical in construction of the disk player.

According to yet a further aspect of the present invention, there is provided a disk player with an integrated disk changer, comprising a cartridge loading section into which a disk cartridge in which a plurality of disks are accommodated is to be inserted, a lifting section disposed for up and down movement along a disk discharging opening of a disk cartridge loaded in position on the cartridge loading section, the lifting section having a mechanism for drawing out a disk from within a disk cartridge loaded in position on the disk cartridge loading section as well as a clamper and a clamp arm which supports a center shaft of the clamper thereon, a turntable located at a lowered position of the lifting section for driving a disk thereon to rotate, an optical pickup located also at the lowered position of the lifting section for reading information recorded on a disk on the turntable, a first fulcrum provided on the lifting chassis for supporting the clamp arm for rocking motion with respect to the lifting chassis when the lifting section is at its lifted position, a second fulcrum for supporting the clamp arm for rocking motion at a position spaced farther from the clamper than the first fulcrum when the lifting section is at its lowered position, and a spring for urging the clamp arm downwardly toward the turntable at an intermediate position between the first fulcrum and the second fulcrum.

With the disk player with an integrated disk changer, when the lifting section is moved in order to search a disk within a cartridge loaded in positioning in the cartridge loading section and draw out the disk, the clamp arm is spaced from the second fulcrum and consequently is supported only at the first fulcrum provided on the lifting chassis. In this instance, the urging force of the spring acts at a location farther from the clamper than the first fulcrum. Accordingly, the clamper assumes its lifted position by the urging force of the spring and will not interfere with a disk to be drawn into the lifting section. On the contrary, after the lifting section is lowered in order to achieve audio or data reproduction from a disk, the clamper is supported at the second fulcrum. In this instance, since the spring is located intermediately between the clamper and the second fulcrum, the clamper is urged toward the turntable by the urging force of the spring to thus clamp the disk between the clamper and the turntable. In this manner, the single spring can exert a force for lifting the clamper to its lifted position and another force for clamping a disk between the clamper and the turn table. In addition, the lifting operation and clamping operation of the clamp can be realized by a very simple mechanism.

Meanwhile, where the clamp arm is supported at the second fulcrum by means of a V-shaped recess, even if the accuracy in dimension of the clamp arm provided on the lifting section is comparatively poor, the clamp arm is positioned accurately when the lifting section is lowered to its playing position. Consequently, centering between the clamper and the turntable is readily attained.

According to yet another aspect of the present invention, there is provided a disk player with an integrated disk changer, comprising a cartridge loading section into which a disk cartridge in which a plurality of disks are accommodated is to be inserted, a disk drawing-out mechanism located in an opposing relationship to a disk discharging opening of a disk cartridge inserted in position in the cartridge loading section for drawing out a disk from within the cartridge, a disk discharging member disposed for back and fourth movement in a disk pushing out direction and also for up and down movement along the disk discharging opening of a cartridge loaded in position in the cartridge loading section to search a disk within the cartridge, the disk discharging member having a disk pressing portion for pushing out a disk within a disk cartridge inserted in position in the cartridge loading section to the disk drawing-out mechanism, a cartridge table located on the cartridge loading section for receiving a cartridge on an upper face thereof, an ejecting mechanism located on the cartridge loading section below the cartridge table for discharging a cartridge from the cartridge loading section, and an eject driving section providing on the disk discharging member for driving the ejecting mechanism when the disk discharging member is moved to a position at which the disk pressing portion thereof passes below the cartridge.

With the disk player with an integrated disk changer, an ejecting operation of a cartridge is performed making use of an operation of the disk discharging member. In particular, the disk discharging member is moved upwardly or downwardly so that it may select one of a plurality of disks in a cartridge loaded in position in the cartridge loading section, and after a vertical position corresponding to a predetermined disk is reached, the disk discharging member is moved back and forth to discharge the disk from within the cartridge. To the contrary, in an ejecting operation to discharge the cartridge, the disk discharging member is lowered to a position below the cartridge so that the back and forth movement thereof may not interfere with the disks in the cartridge, and at that position, the disk discharging member is moved back and forth. Making use of such movement, the ejecting mechanism located below the cartridge table is driven by the eject driving section provided on the disk discharging member, and the cartridge is thus discharged from the cartridge loading section by the operation of the ejecting mechanism. Accordingly, there is no necessity of provision of a separate driving source for discharging a cartridge, and the disk player can be constructed with a reduced size and a reduced weight.

According to an additional aspect of the present invention, there is provided a disk player with an integrated disk changer which includes a cartridge loading section into which a disk cartridge in which a plurality of disks are accommodated is to be inserted, and a disk feeding mechanism for selectively taking out one of the disks within a disk cartridge loaded in position in the disk loading section and for introducing the disk to a disk playing section, which comprises a cartridge table located on the cartridge loading section for guiding a cartridge, a locking member mounted for movement on the cartridge table and normally urged in a direction to fit into a locking recess formed in a disk cartridge loaded in position in the cartridge loading section, a sliding lever mounted on the cartridge table such that, when a disk cartridge is to be inserted into the disk loading section, the sliding lever may be pushed by the cartridge to move toward the interior of the cartridge loading section, a spring normally urging the sliding lever toward a cartridge insertion opening of the cartridge loading section, and an eject lever connected to be power-driven to pivot in response to a discharging operation of a disk cartridge, the sliding lever having a pressing portion for retracting the locking member from the locking recess of a cartridge loaded in position in the disk loading section when the cartridge is to be moved toward the cartridge insertion opening of the cartridge loading section, the sliding lever and the ejecting lever having a first pressing engaging means for pushing the sliding lever toward the insertion opening at a first stroke when the eject lever is pivoted in response to a discharging operation of the disk cartridge, and a second pressing engaging means for pushing the sliding lever toward the insertion opening afterwards.

With the disk player with an integrated disk changer, if a disk cartridge is inserted into the cartridge receiving section, then the sliding lever is pushed to move in the insertion direction of the cartridge toward the interior of the disk receiving section. When the cartridge comes to a predetermined position, the locking member which has been restricted by the pressing portion of the lever until then is now projected so that it is fitted into the locking recess of the disk cartridge thereby to lock the disk cartridge in position. Then, when the cartridge is to be unloaded, the eject lever is pivoted by the power of a motor or the like. At the first stroke of the pivotal motion, the eject lever pushes the first sliding lever toward the insertion opening by way of the first pressing engaging means. Thereupon, the pressing portion provided on the sliding lever retracts the locking member to cancel the locked condition of the disk cartridge. If the eject lever is further pivoted, it presses against the sliding lever now by way of the second pressing portion. The sliding lever is thus pushed to move substantially to the last position by the eject lever, whereupon the sliding lever pushes out the disk cartridge toward the insertion opening. Since the sliding lever is pushed out by the eject lever in this manner upon discharging of the cartridge, the urging force of a spring which urges the sliding lever toward the insertion opening may be comparatively weak. Accordingly, the resistance to insertion of a cartridge is reduced, which facilitates an inserting operation of a cartridge.

Particularly where the disk changer of the disk player is arranged in a vertical orientation such that a disk cartridge may be loaded in position from above, a cartridge can be positively discharged from the disk player.

The above and other objects, features and advantages of the present invention will become apparent from the following description and the appended claims, taken in conjunction with the accompanying drawings.

BRIEF DESCRIPTION OF THE DRAWINGS

FIG. 4 is a perspective view showing a lifting section (disk feeding mechanism) of the apparatus of FIG. 1;

FIGS. 5A and 5B are enlarged front elevational views showing a mechanism for driving a disk discharging member at different positions;

FIG. 6 is a plan view of the mechanism shown in FIGS. 5A and 5B;

FIG. 12 is a plan view illustrating a discharging operation of a disk cartridge;

DETAILED DESCRIPTION OF THE PREFERRED EMBODIMENT

Figure 1:
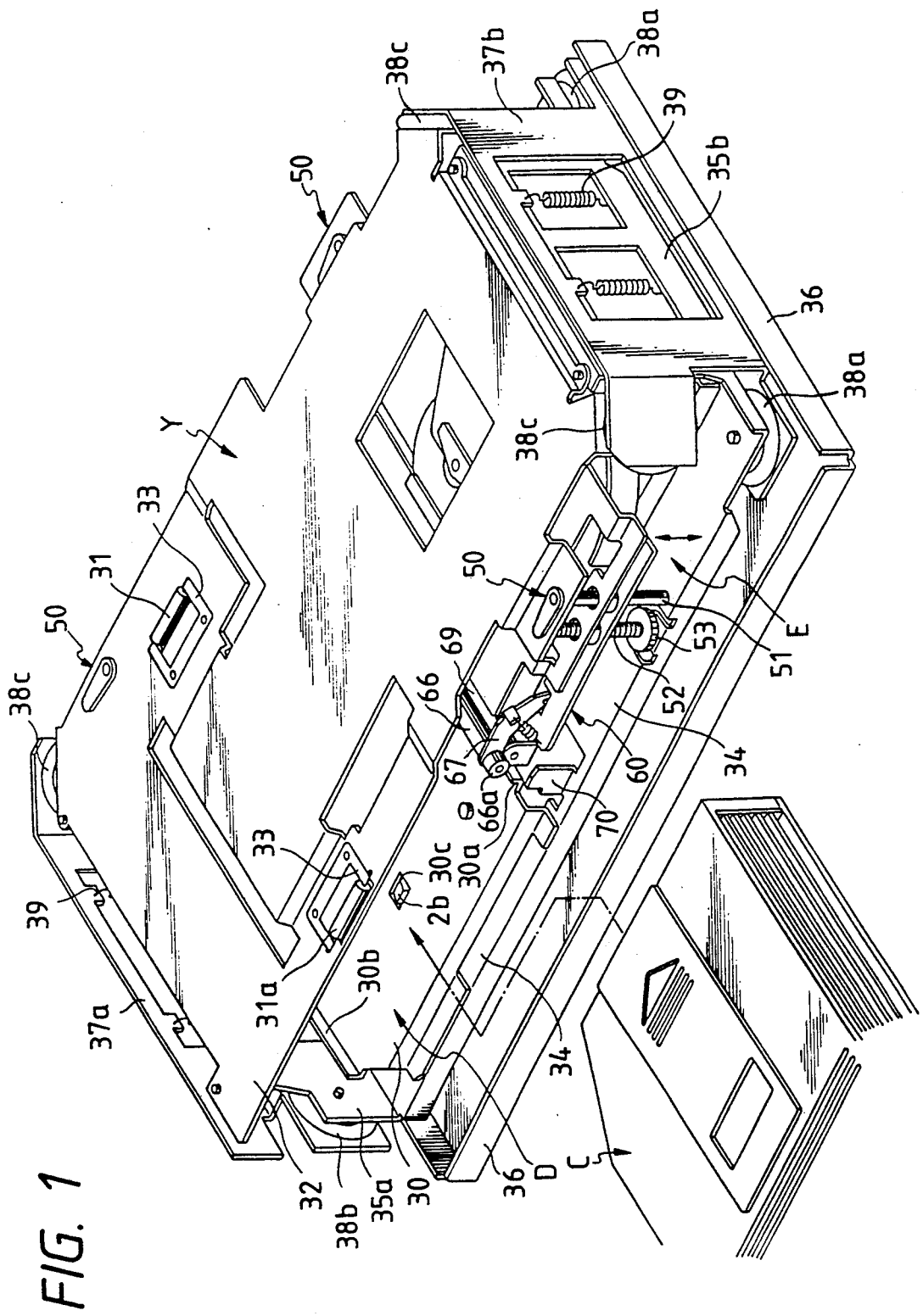
FIG. 1 is a perspective view of an apparatus including a disk changer and a disk reproducing device integrated with the disk changer with a cover omitted, showing a preferred embodiment of the present invention.

Referring first to FIG. 1, there is shown an apparatus according to the present invention. The apparatus shown includes a cartridge loading section generally denoted at D and a disk playing section generally denoted at E. A disk cartridge C in which a plurality of disks, here in the form of compact disks, are accommodated is inserted into the cartridge loading section D from the front side. A cartridge table 30 is located below the disk loading section D. The cartridge table 30 is secured to a bottom plate 34 such that a disk cartridge C may be positioned into the disk loading section under the guidance of the cartridge table 30. A pair of pressing rollers 31 and 31a are mounted on a top plate 32 of the apparatus. Each of the pressing rollers 31 and 31a is supported on a spring plate 33 so that a cartridge C loaded in position may be pressed against the cartridge table 30 by the pressing rollers 31 and 31a under the downward force of the spring plates 33.

Figure 2:
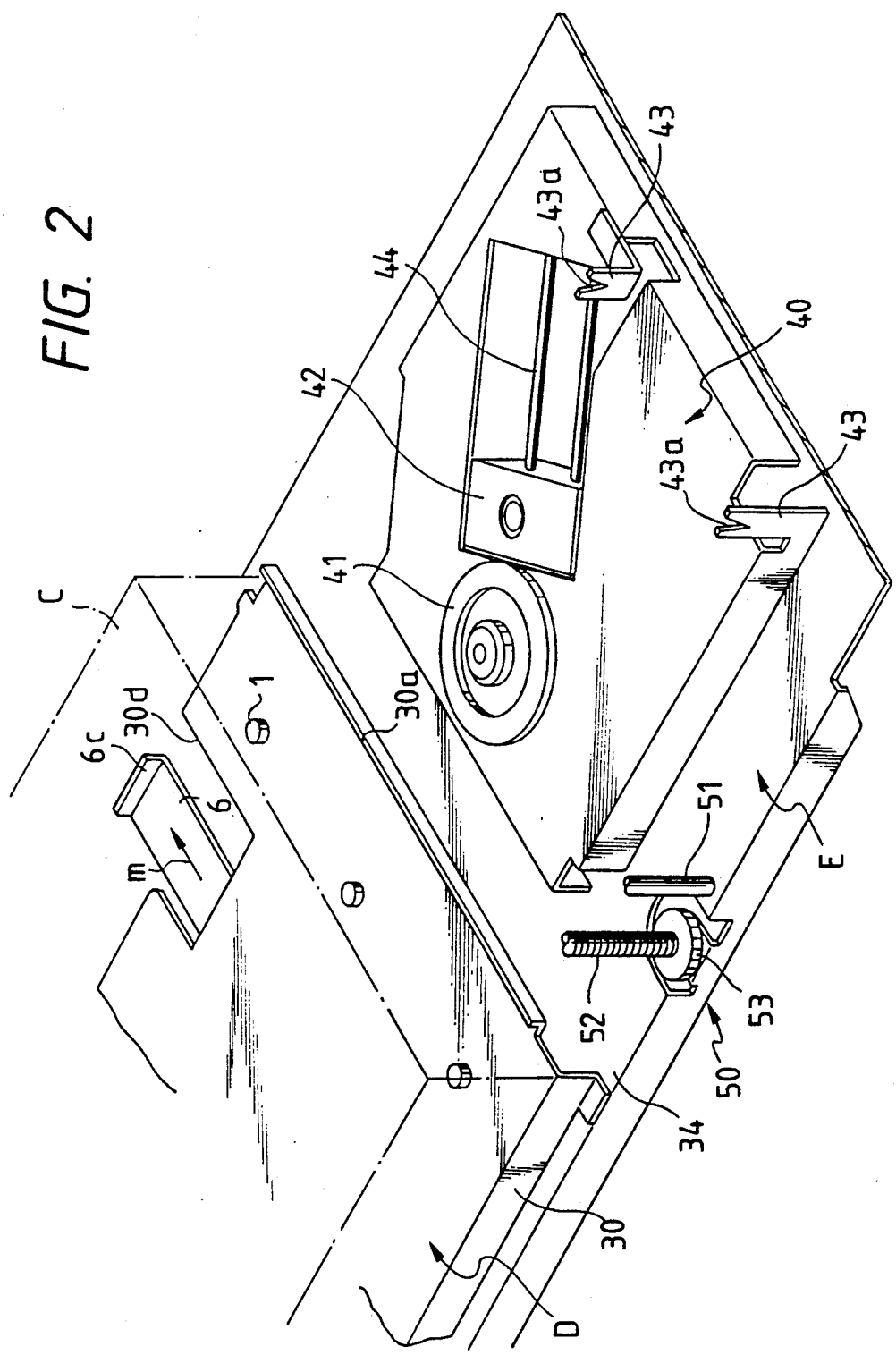
FIG. 2 is a perspective view showing a cartridge loading section and a disk playing section of the apparatus of FIG. 1.

Referring now to FIG. 2, a disk drive unit 40 is disposed at the disk playing section E adjacent the cartridge loading section D. The disk drive unit 40 is secured to an upper face of the bottom plate 34 juxtaposed to the disk table 30. The disk drive unit 40 includes a turntable 41, an optical pickup 42, and a pair of clamper supporting members 43. The disk drive unit 40 is disposed at a lowermost location of the entire apparatus shown in FIG. 1. Thus, a disk DS drawn out from the disk cartridge C by a lifting section 60 which will be hereinafter described is transported to the lowermost location, placed at a central portion thereof onto the turntable 41 and clamped by a clamper which will also be hereinafter described. Then, the disk DS is rotated together with the turntable 41 by a motor M (FIG. 6), and the optical pickup 42 is moved along a pair of guide shafts 44 to read the disk DS.

Referring back to FIG. 1, the disk loading section D and the disk playing section E are located in a unit Y which is formed from the top plate 32, the bottom plate 34, and a pair of left and right side plates 35a and 35b interconnecting the top and bottom plates 32 and 34. The unit Y thus formed from the top and bottom plates 32 and 34 and the opposite side plates 35a and 35b is supported on a casing provided outside the unit Y. In particular, the casing is constituted from a bottom casing member 36, and a pair of side casing members 37a and 37b secured to the bottom casing member 36. The unit Y is supported in a floating relationship on the casing by means of a plurality of floating dampers 38a, 38b and 38c in the form of rubber housings which are filled with suitable air or liquid. The apparatus shown in FIG. 1 is constructed on the assumption that the bottom plate 34 and the bottom casing member 36 are installed in a horizontal posture, and the side plates 35a and 37b, respectively, by means of suspending springs 39 extending in a vertical direction. It is noted that the disk changer may be installed otherwise in such an orientation that a cartridge may be inserted vertically downward from above, that is, the horizontal plane of the apparatus shown in FIG. 1 may extend in a vertical direction. In this instance, the suspending springs 39 must be reinstalled so that the unit Y may be suspended against the direction of gravity. While the floating dampers 38c support the unit Y at an angle of 45 degrees with respect to the longitudinal and depthwise directions of the unit Y, where the disk changer is installed in such an orientation that a cartridge may be inserted vertically downward as described above, the floating dampers 38c of the 45 degree disposition will support the unit Y and effectively exhibit a damping effect.

Figure 3:
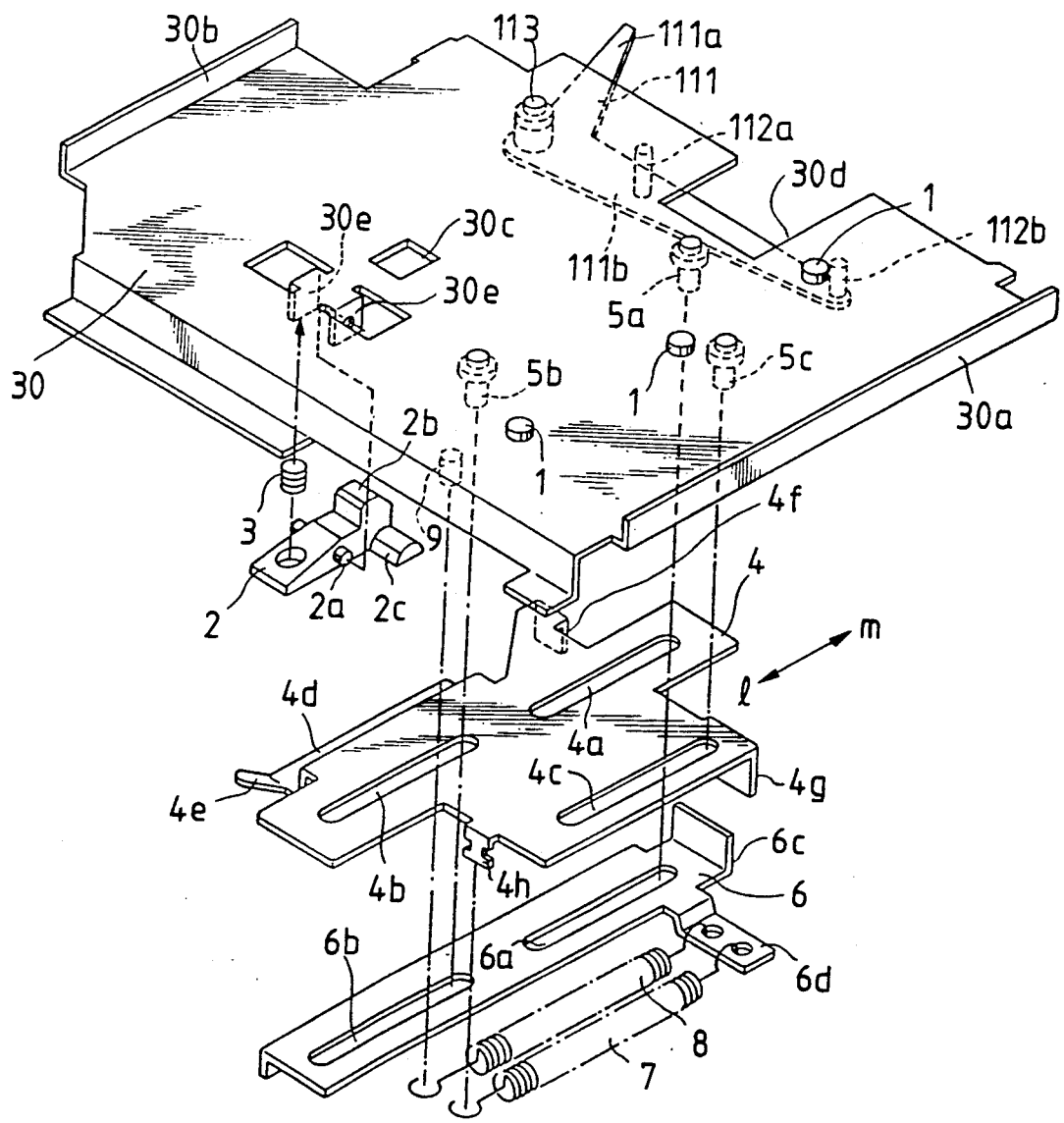
FIG. 3 is an exploded perspective view showing a cartridge ejecting device located below the cartridge loading section shown in FIG. 2.
Figure 7:
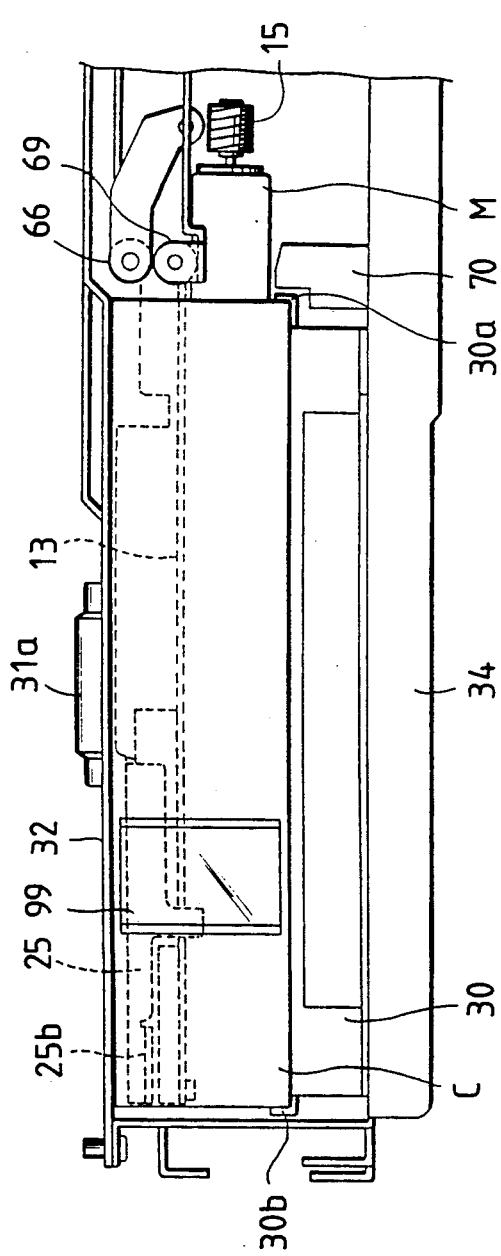
FIGS. 7 and 8 are enlarged front elevational views showing the apparatus of FIG. 1 at different positions with a cartridge loaded thereon.
Figure 10:
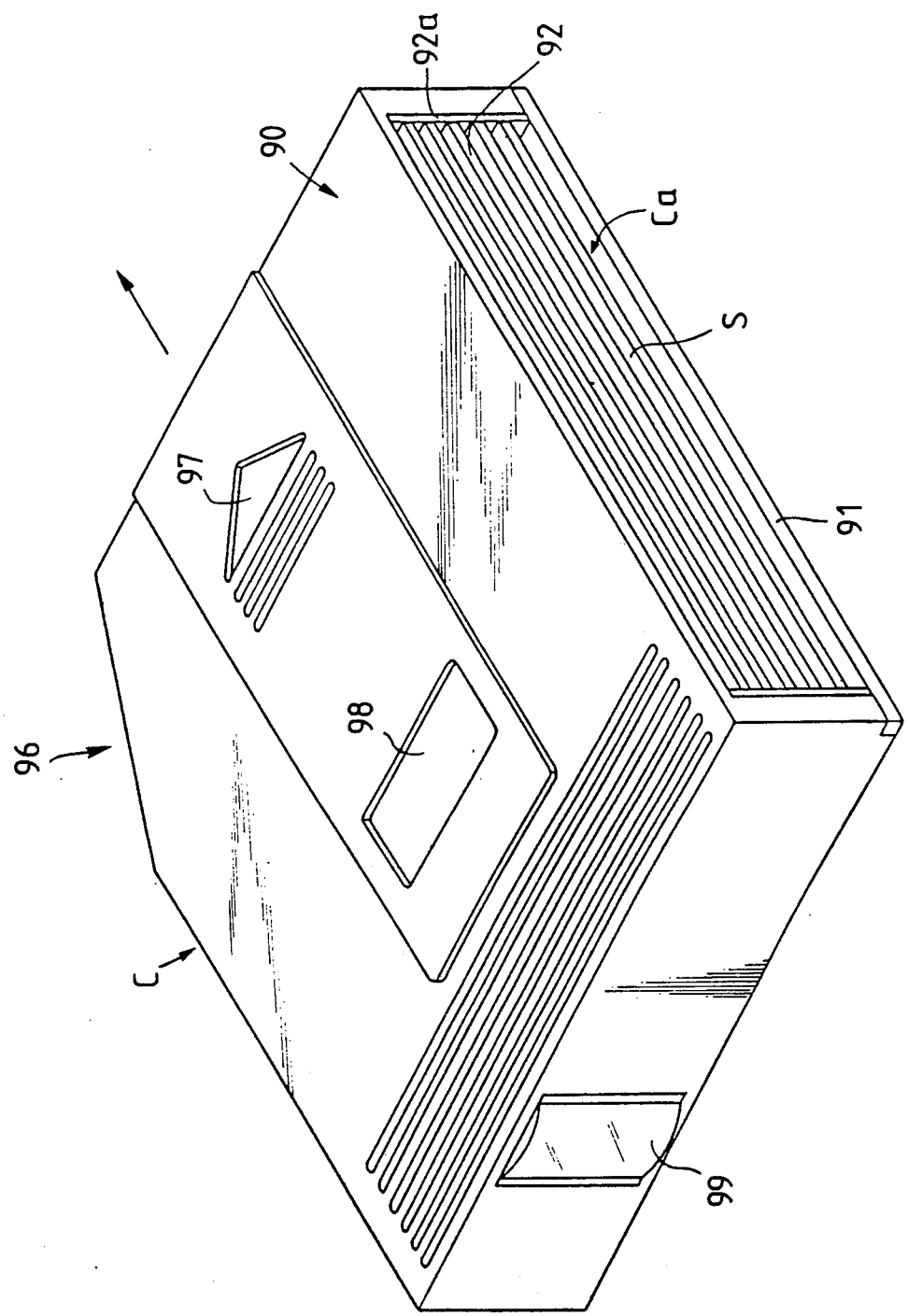
FIG. 10 is a perspective view showing a disk cartridge.
Figure 11:
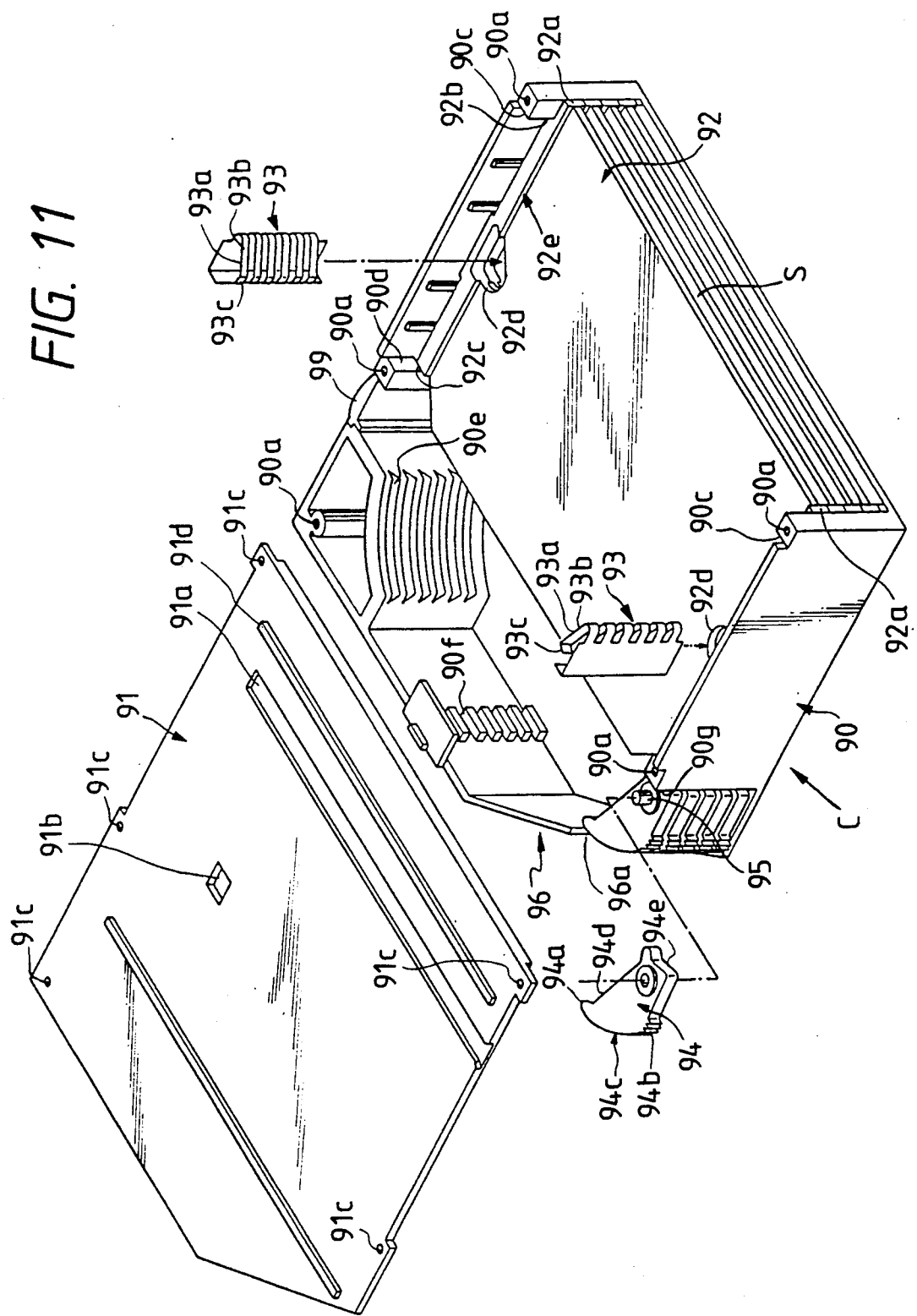
FIG. 11 is an exploded perspective view showing the disk cartridge of FIG. 10 upside down.

Referring now to FIG. 3, a pair of guide walls 30a and 30b are formed by bending along the left and right opposite side edges of the cartridge table 30 located at the cartridge loading section D. Further, three guide pins 1 are provided on an upper face of the cartridge table 30. When a cartridge C having the configuration as shown in FIGS. 10 and 11 is to be loaded in position into the cartridge loading section D, it is guided by a guideway 91a (refer to FIG. 11) formed in a bottom wall thereof by the guide pins 1 while the opposite lower side edges of the cartridge C are guided by the guide walls 30a and 30b of the cartridge table 30 as seen in FIG. 7.

The cartridge table 30 has a pair of supporting lugs 30e formed at a substantially central portion thereof by bending, and a locking window 30c is formed at a location of the cartridge table 30 near the supporting lugs 30e. A locking member 2 is mounted on the supporting lugs 30e of the cartridge table 30. The locking member 2 is supported for rocking motion on the supporting lugs 30e with a shaft 2a thereof fitted in a pair of supporting holes formed in the supporting lugs 30e. The locking member 2 has a locking projection 2b and a driving piece 2c formed thereon. A coil spring 3 is interposed between a lower face of the cartridge table 30 and the locking member 2 to urge the locking member 2 in a direction to project the locking projection 2b thereof upwardly from the locking window 30c of the cartridge table 30. Three supporting pins 5a, 5b and 5c are provided on and extend downwardly from the lower face of the cartridge table 30. A first sliding lever 4 having three elongated holes 4a, 4b and 4c formed therein is mounted for sliding movement on the cartridge table 30 with the supporting pins 5a, 5b and 5c fitted in the elongated holes 4a, 4b and 4c thereof, respectively. The first sliding lever 4 has an offset pressing portion 4d formed at a side portion thereof. The pressing portion 4d of the first sliding lever 4 has an inclined guide face 43 thereon. When the first sliding lever 4 is moved in the direction indicated by an arrow mark 1, the driving piece 2c of the locking member 2 is pushed by the pressing portion 4d of the first sliding lever 4 so that the locking member 2 is pivoted in the clockwise direction to retract the locking projection 2b thereof downwardly below the locking window 30c of the cartridge table 30. Conversely, when the first sliding lever 4 is moved in the opposite direction indicated by an arrow mark m, the pressing portion 4d thereof is moved away from the driving piece 2c of the locking member 2 whereupon the locking member 2 is pivoted in the counterclockwise direction by the urging force of the coil spring 3 to project the locking projection 2b thereof upwardly from the locking window 30c of the cartridge table 30. The first sliding lever 4 further has a first pressure receiving lug 4f and a second pressure receiving lug 4g formed thereon. The first sliding lever 4 additionally has a spring hook 4h formed at the opposite end thereof by bending.

A second sliding lever 6 is disposed in an overlapping relationship below the first sliding lever 4. The second sliding lever 6 has a pair of elongated holes 6a and 6b formed therein, and the supporting pins 5a and 5b on the cartridge table 30 are fitted in the elongated holes 6a and 6b, respectively, in the second sliding lever 6 to support the second sliding lever 6 for sliding movement in the directions indicated by the arrow marks 1 and m independently of the first sliding lever 4. A pressing bent lug 6c is formed at an end of the second sliding lever 6 and extends upwardly through and from a recess 30d formed in the cartridge table 30 as shown in FIG. 2. Thus, when a cartridge C is inserted in position into the cartridge loading section D, the pressing lug 6c of the second sliding lever 6 is pushed by the cartridge C to move the second sliding lever 6 in the same direction, but when the cartridge C is to be discharged, the pressing lug 6c acts to push the cartridge C to move out of position. A spring supporting finger 6d is formed on and extends laterally from the second sliding lever 6, and a pair of coil springs 7 and 8 are each connected at one end thereof to the spring supporting finger 6d. The other end of the coil spring 7 is anchored at the spring hook 4h of the first sliding lever 4 and interconnects the first sliding lever 4 and the second sliding lever 6. Conversely, the other end of the other coil spring 8 is anchored at a spring pin 9 provided on the lower face of the cartridge table 30. As described hereinabove, the first sliding lever 4 and the second sliding lever 6 which are interconnected by the coil spring 7 are normally forced in the direction of the arrow mark 1 by the coil spring 8.

Figure 9A:
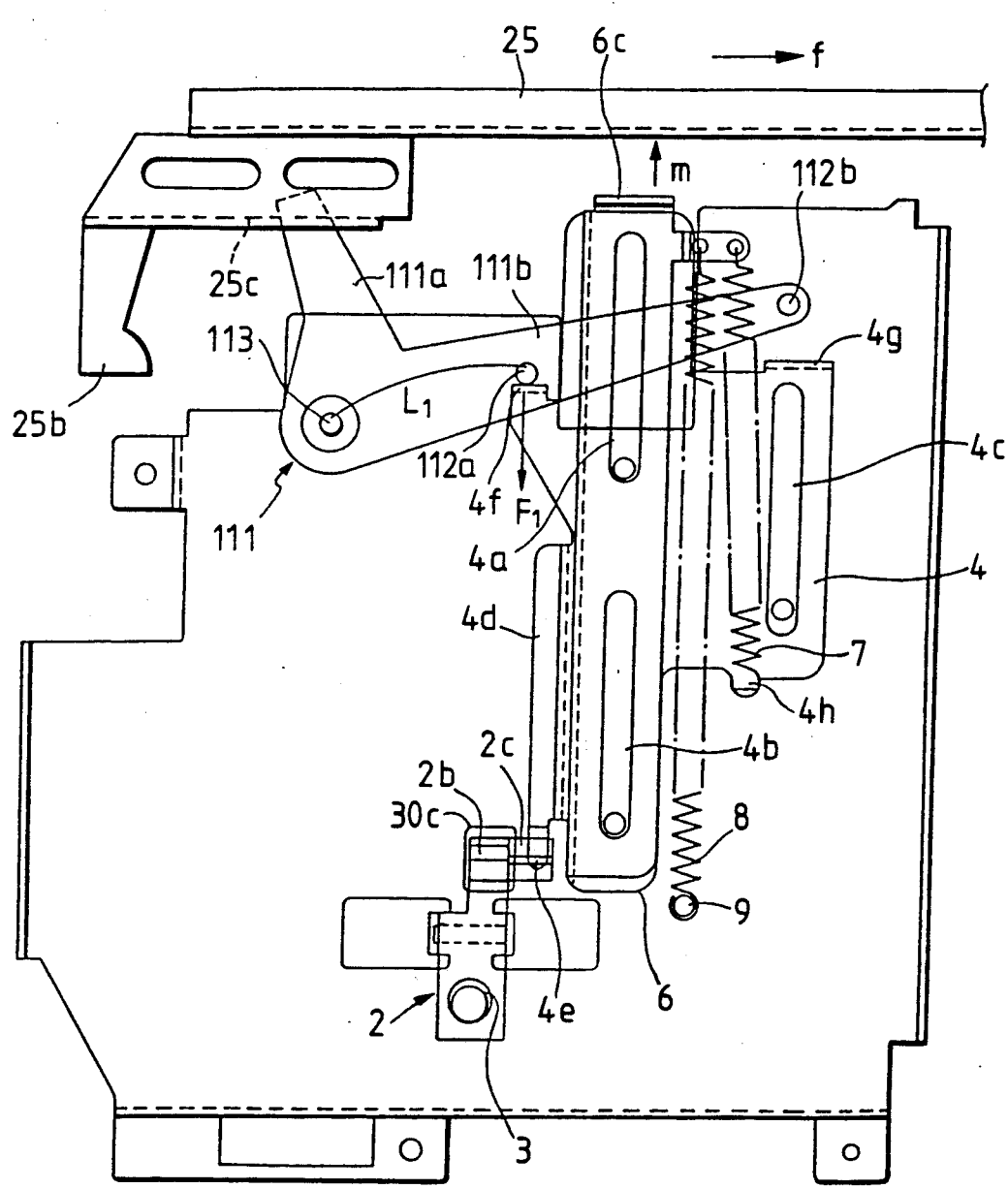
FIGS. 9A and 9B are plan views showing the cartridge ejecting device of FIG. 3 at different position 5.
Figure 9B:
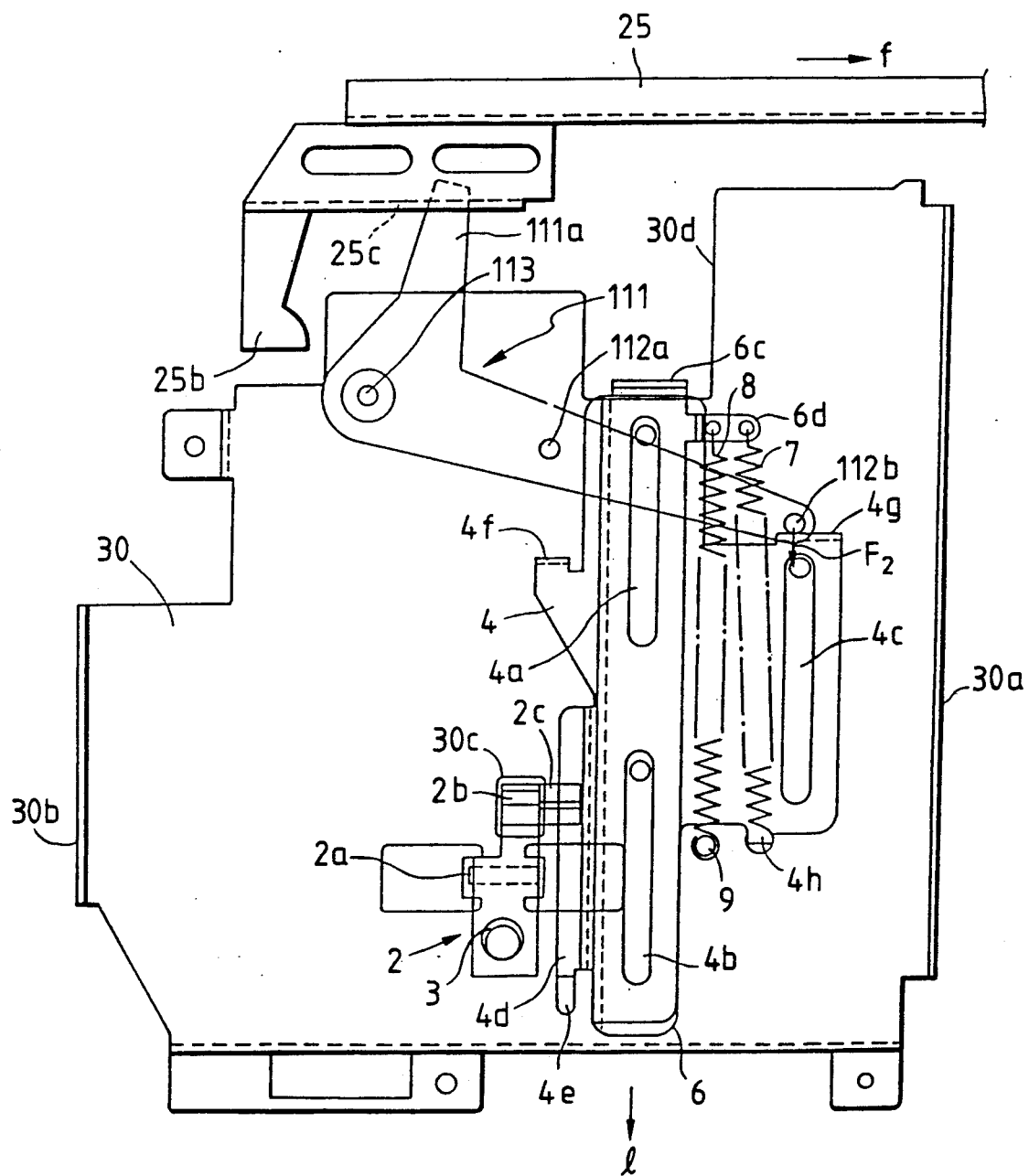

Further, a supporting pin 113 is provided on the lower face of the cartridge table 30, and an eject lever 111 is supported for pivotal motion on the cartridge table 30 by means of the supporting pin 113. The eject lever 111 has a driven arm 111a which extends sidewards from the cartridge table 30. The eject lever 111 further has a driving arm 111b which has a first driving pin 112a and a second driving pin 112b provided thereon. As shown in FIGS. 9A and 9B, the first driving pin 112a of the eject lever 111 is opposed to the first pressure receiving lug 4f of the first sliding lever 4 and cooperates with the first pressure receiving lug 4f to form a first pressing engaging means, while the second driving pin 112b is opposed to the second pressure receiving lug 4g of the first sliding lever 4 and cooperates with the second pressure receiving lug 4g to form a second pressing engaging means.

Referring back to FIGS. 1 and 2, three lifting mechanisms 50 are provided in the unit Y. Each of the lifting mechanisms 50 includes a guide shaft 51, a lifting screw 52 and a gear 53 secured to the lifting screw 52. The gears 53 of the lifting mechanisms 50 are connected to be driven to rotate in a synchronized relationship to each other by a common driving mechanism (not shown) located on the lower face of the bottom plate 34. The lifting section or disk feeding mechanism 60 is thus driven to move in upward and downward directions in the unit Y by the three lifting mechanisms 50.

Referring now to FIG. 4, the lifting section or disk feeding mechanism 60 has three guide holes 61 and adjacent female threaded holes 62 formed therein. The guide shafts 51 of the lifting mechanisms 50 are fitted in the respective guide holes 61 formed in the lifting section 60, while the lifting screws 52 of the lifting mechanisms 50 are threaded in the female threaded holes 62 of the lifting section 60. When the gears 53 are driven by the driving mechanism located below the bottom plate 34, the lifting screws 52 of the lifting mechanisms 50 are rotated synchronously to move the lifting section 60 shown in FIG. 4 upwardly or downwardly in the unit Y. By such upward or downward movement, the lifting section 60 comes to a position at which one of the disks accommodated in the disk cartridge C loaded in position can be taken out of the disk cartridge C or another position at which the disk cartridge C can be discharged.

The lifting section 60 includes a support plate 13 on which a pair of guide pins 26 are provided. A disk discharging member 25 is supported for linear movement in the directions indicated by arrow marks e and f by the guide pins 26 on the support plate 13. The disk discharging member 25 is connected to be driven by a power converting device 10 shown in FIGS. 5A, 5B and 6.

Referring to FIGS. 5A, 5B and 6, the power converting device 10 includes a driving gear 11 supported for rotation on a shaft 12. The shaft 12 is secured to a supporting portion 13a which is projected from the backside of the support plate 13 as particularly seen in FIG. 6. The driving gear 11 is formed in an integral relationship on a hub 11a which has another gear 11b of a larger diameter formed in an integral relationship at an end thereof. The gear 11b is held in normal meshing engagement with a pinion 14. Thus, the power of the motor M carried on the lifting section 60 is transmitted to the pinion 14 by worm gear 15 to thus drive the gear 11b and the driving gear 11 to rotate. A change-over lever 16 is mounted at an end portion of the driving gear 11 for pivotal motion coaxially with the driving gear 11. The change-over lever 16 is normally held in frictional contact with the end of the driving gear 11 under the force of a spring 17. Accordingly, when the driving gear 11 is rotated, the change-over lever 16 is pivoted in the same direction through frictional engagement between them. The change-over lever 16 has an arm 16a extending therefrom, and the arm 16a is bent perpendicularly at an end portion thereof to form a hook 16b. The hook 16b of the change-over lever 16 extends into a recess 13b formed in the support plate 13 as seen in FIG. 5B. When the driving gear 11 is rotated, the change-over lever 16 is pivoted following the same within a predetermined angular range defined by the recess 13b of the support plate 13 within which the hook 16b of the change-over lever 16 is permitted to move. Accordingly, in case the driving gear 11 is rotated, for example, in the clockwise direction in FIG. 5A, the change-over lever 16 is pivoted within the small limited angular range following the driving gear 11. Thus, after the hook 16b abuts an edge of the recess 13b, the change-over lever 16 is stopped while only the driving gear 11 continues its rotation.

The power converting device 10 further includes a change-over gear 18 supported on a shaft 19 which is secured to the support plate 13. The change-over gear 18 has a series of teeth 18a formed on an outer circumference thereof over a predetermined angular range delineated by the opposite ends B1 and B2 as particularly seen in FIG. 5A. The change-over gear 18 is located such that the teeth 18a thereof may be meshed with the driving gear 11 so that the driving gear 11 may drive the change-over gear 18 over the angular range between the points B1 and B2. The change-over gear 18 has a pair of pressure receiving projections 20a and 20b provided thereon. The pressure receiving projections 20a and 20b may each be a pin implanted on the change-over gear 18. The pressure receiving projection 20a is disposed in a spaced relationship from the end point B1 of the teeth 18a of the change-over gear 18 while the other pressure receiving projection 20b is disposed in a spaced relationship from the other end point B2 of the teeth 18a. The change-over lever 16 is thus located such that, when it is pivoted, the arm 16a thereof may press against the pressure receiving projection 20a or 20b on the change-over gear 18 as seen from FIG. 6.

Referring back to FIG. 4, a return spring 63 is interposed between the disk discharging member 25 and the support plate 13 to normally force the disk discharging member 25 in its returning direction, that is, in the direction indicated by the arrow mark e. The disk discharging member 25 has a disk pressing piece 25b and an ejecting driving projection 25c formed in an integral relationship at a left-hand side end portion thereof.

The lifting section 60 includes a reduction gear train 64 which is held in meshing engagement with the pinion 14 which is connected to be driven by the motor M to drive the power converting device 10. The reduction gear train 64 is held in meshing engagement also with a roller driving gear 65. The roller driving gear 65 is secured to an end portion of an upper disk drawing in roller 66. The upper disk drawing in roller 66 is supported at the opposite end portions thereof on a pair of rocking levers 67 which are each supported for rocking motion around a pin 67a. Each of the rocking levers 67 is normally forced downwardly by a spring 68 to provide a disk holding force between the upper drawing-in roller 66 and a lower drawing-in roller 69. The lower drawing-in roller 69 is supported for rotation at a fixed location. The upper drawing-in roller 66 has a pair of extensions 66a provided at the opposite ends thereof and extending outwardly from the rocking levers 67. Referring to FIG. 1, the bottom plate 34 has a pair of roller restricting tabs 60 (only one is shown) provided thereon such that they may be contacted, when the lifting section 60 is lowered to the disk playing position, with the extensions 66a of the upper drawing-in roller 66 to pivot the rocking levers 67 so that the upper drawing-in roller 66 may escape upwardly relative to the lifting section 60 being lowered, thereby canceling the disk holding force of the rollers 66 and 69 (refer to FIG. 8).

Referring back to FIG. 4, a clamp arm 81 is supported on a lifting chassis 85 of the lifting section 60. A pair of supporting pins 82 serving as a first fulcrum arm are secured to the lifting chassis 85 and received in supporting holes 81b formed in the clamp arm 81 to support the clamp arm 81 thereon. The supporting pins 82 are received in a comparatively loose fitting relationship in the supporting holes 81b so that the clamp arm 81 may be supported for rocking motion and also for limited upward and downward movement on the supporting pins 81b. The clamp arm 81 further has a pair of downwardly bent supporting lugs 81a formed at a rear end portion thereof. When the lifting section 60 is lowered to the disk playing position in the unit Y, the supporting lugs 81a at the rear end portion of the clamp lever 81 are fitted into V-shaped recesses 43a of the clamper supporting members 43 of the disk drive unit 40 shown in FIG. 2. The V-shaped recesses 43a of the clamper supporting members 43 serve as a second fulcrum. When the supporting lugs 81a of the clamp lever 81 are fitted in the V-shaped recesses 43a of the clamper supporting members 43, a pair of projections 81c extending downwardly from the supporting lugs 81a are positioned just inside and engage with the clamper supporting members 43 so that they may prevent the clamp arm 81 from being displaced in a horizontal sideward direction. The clamp arm 81 further has an inclined guide piece 81d and a stopper lug 81e formed thereon. The inclined guide piece 81d acts to guide an end of a disk DS being drawn out of a cartridge C in a downward direction while the stopper lug 81e acts to engage with the end of the disk DS thus drawn out to stop the disk DS.

A spring 86 is mounted at a rear end of the lifting chassis 85. An arm 86b of the spring 86 is received by an upper face of the lifting chassis 85 while the other arm 86a is anchored at a spring receiving lug 81f formed on the clamp arm 81. Thus, the clamp arm 81 is normally forced downwardly at an intermediate location thereof between the supporting pins (first fulcrum) 82 and the V-shaped recesses 43a (second fulcrum) of the clamper supporting members 43 by the spring 86.

A clamper 80 is supported for rotation at an end of the clamp arm 81 by means of a center shaft 80a. When the clamper 80 is forced upwardly, it is stopped by a bent stopper lug 85a formed on the lifting chassis 85. The clamper 80 has a magnet (not shown) mounted therein, and in the condition shown in FIG. 4, the clamper 80 is held attracted to the stopper lug 85a of the lifting chassis 85 by the magnetic attracting force of the magnet in the clamper 80. To the contrary, when the lifting section 60 is lowered to the disk playing position and the clamper 80 is urged toward the turntable 41, the clamper 80 is attracted to the turntable 41 by the magnetic attracting force of the magnet in the clamper 80. Consequently, a disk DS on the turntable 41 is clamped between the turntable 41 and the clamper 80.

Figure 14:
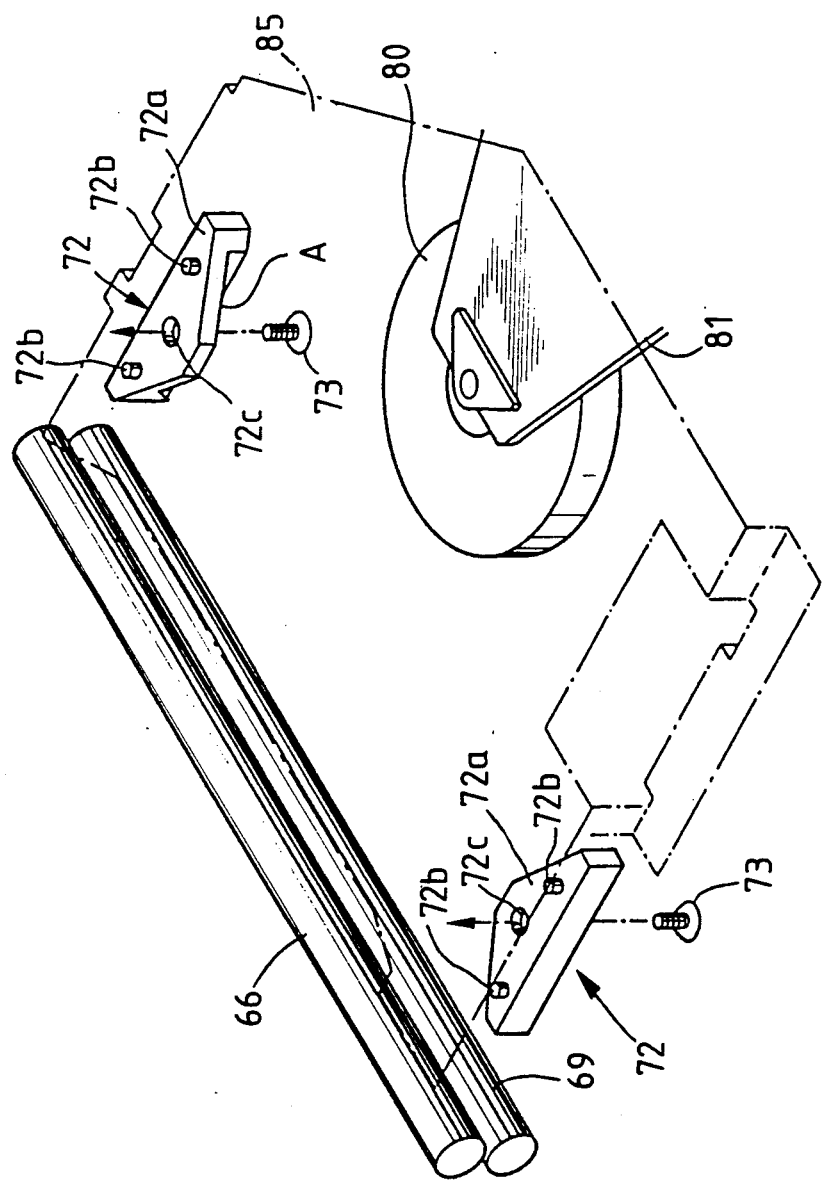
FIG. 14 is a partial perspective view showing the disk guide of FIGS. 13A and 13B mounted on the lifting section shown in FIG. 4.

Referring now to FIG. 14, a pair of disk guides 72 are mounted at the opposite left and right side portions of the lower face of the lifting chassis 85 provided in the lifting section 60. The disk guides 72 may be made of a suitable synthetic resin material.

Figure 15A:
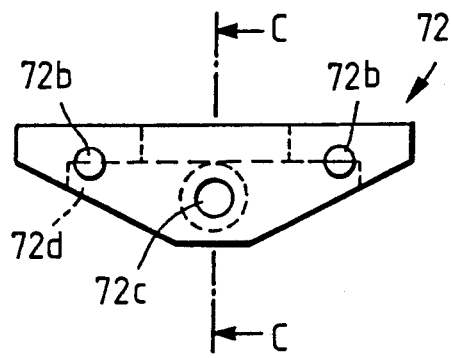
FIGS. 15A and 15B are a plan view and a front elevational view, respectively, of the disk guide shown in FIG. 14.
Figure 15B:
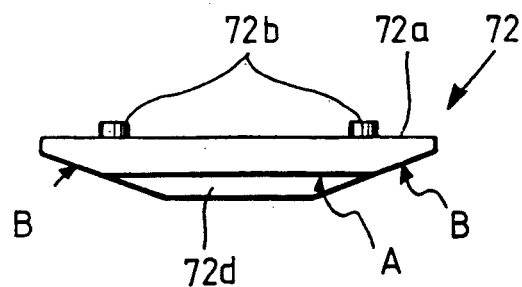
Figure 15C:
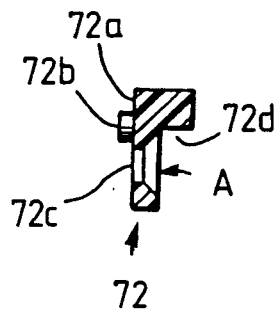
FIG. 15C is a sectional view taken along line C—C of FIG. 15A.
Figure 16:
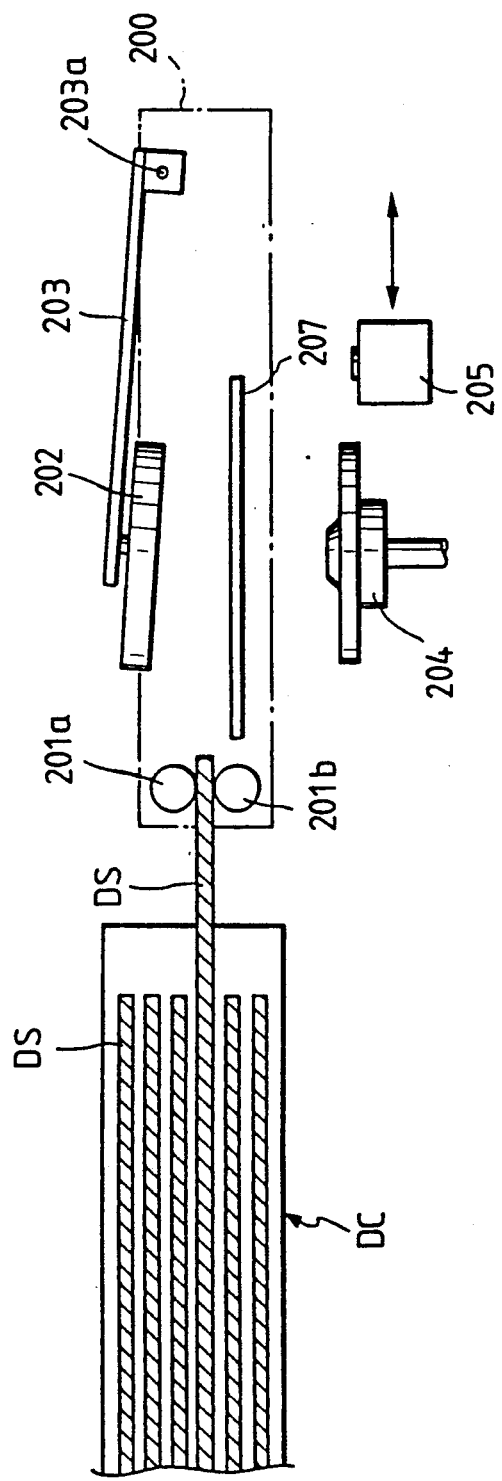
FIG. 16 is a schematic side elevational view illustrating a conventional disk changer-integrated disk player.

Referring now to FIGS. 15A to 15C, each of the disk guides 72 has at the top thereof a mounting face 72a at which it is mounted on the lower face of the lifting chassis 85. A pair of positioning projections 72b are formed on the mounting face 72a of the disk guide 72 while a mounting hole 72c is perforated substantially at the center of the disk guide 72. The mounting hole 72c here is countersunk as particularly seen in FIG. 15C. A pair of steps 72d are formed on a lower face of the disk guide 72, and a guide face A is formed on the disk guide 72 between the steps 72d. A pair of inclined guide faces B are formed at the opposite front and rear end portions of the disk guide 72 as shown in FIG. 15B. The inclined guide faces B are directed in a drawing-in direction and a discharging direction when a disk DS is drawn into and discharged from the lifting section 60. As shown in FIG. 14, the disk guides 72 are mounted on the lower face of the lifting chassis 85 in such an orientation that the steps 72d thereof are opposed to each other and the guide faces A are directed downwardly. In this instance, the positioning projections 72b of each of the disk guides 72 are fitted in positioning holes (not shown) formed in the lifting chassis 85. Meanwhile, a flat countersunk head screw 73 is inserted from below into the mounting hole 72c of each of the disk guides 72 and screwed at an end portion thereof into the lifting chassis 85 to secure the disk guide 72 to the lifting chassis 85.

The disk guides 72 are located intermediately between the drawing-in roller 66 and the clamper 80 as seen in FIG. 14. When a disk DS is being drawn into the lifting section 60 by the drawing-in roller 66, it advances with the opposite end portions thereof held in an opposing or contacting relationship to or with the guide faces A of the disk guides 72. Then, when the disk DS is further moved to a position at which it may be clamped by the clamper 80 (a position just above the turntable 41), the disk guides 72 are disengaged from the outer periphery of the disk DS.

Referring back to FIG. 6, the lifting section 60 further includes a support table 71 for supporting thereon from below a disk which has been drawn out from within a cartridge C by the drawing out rollers 66 and 69. When the lifting section 60 is lowered to the playing position, the support table 71 and the lower drawing-in roller 69 are moved to escape downwardly below the turntable 41 so that they may not interfere with the disk which is driven to rotate by the turntable 41 (refer to FIG. 13B).

Referring now to FIG. 10, there is shown a disk cartridge adapted to be loaded into the apparatus described above. The disk cartridge C shown includes an outer casing including a body case 90 made of a plastic material, and a bottom plate 91 covering or closing the open bottom of the body case 90. The cartridge C has an insertion/discharging opening Ca for a disk at a right-hand side thereof with respect to an inserting direction indicated by an arrow mark in FIG. 10. The cartridge C further has an inclined face 96 at a left-hand side front corner thereof with respect to its inserting direction. An arrow mark pattern 97 indicating such inserting direction is formed on an upper face of the body case 90 of the disk cartridge C while the inclined face 96 described above further facilitates discrimination of the inserting direction of the cartridge C. An arresting recess 98 is formed in the upper wall of the body case 90. When the disk cartridge C is to be discharged from the disk changer, the pressing roller 31a on the top plate 32 shown in FIG. 1 may be fitted into the recess 98 of the body case 90 to prevent the discharge of the cartridge C from the disk changer.

Referring now to FIG. 11, the bottom plate 91 of the disk cartridge C shown has up to five screw insertion holes 91c formed at peripheral edge portions thereof, while five female threaded holes 90a are formed in bottom portions (the cartridge is shown upside down in FIG. 11) of the body case 90. The bottom plate 91 is secured to the body case 90 by means of five screws (not shown) screwed into the screw insertion holes 91c of the bottom plate 91 and the female threaded holes 90a of the body case 90. In the disk cartridge C shown, no other fastening screws are used. The bottom plate 91 has a guideway 91f formed therein for guiding the disk cartridge C when it is to be loaded into the disk changer. The bottom plate 91 further has a sliding rail 91d formed thereon at which the disk cartridge C slides on the disk changer when the disk cartridge C is to be inserted into the disk changer. A locking hole 91b is formed at a rear central location of the bottom plate 91, and the locking projection 2b of the locking member 2 (refer to FIGS. 1 and 3) is received in the locking hole 91b to lock the cartridge C in position in the disk changer.

A plurality of partition plates 92 are fitted in the body case 90 of the cartridge C. Each of the partition plates 92 has a pair of spacers 92a provided in an integral relationship at the opposite ends thereof. Each of the spacers 92a has a step 92b at a forward end portion thereof while abutting faces 90c are formed at front ends of a pair of side plates of the body case 90 for abutting with the steps 92b of the partition plates 92. Similarly, abutting faces 90d are formed at rear ends of the side plates of the body case 90 for abutting with rear ends 92c of the spacers 92a. The individual partition plates 92 are positioned with the steps 92b and the rear ends 92c of the spacers 92a on the opposite sides thereof engaged with the engaging faces 90c and 90d on the inner side of the case body 90. The distance between adjacent partition plates 92 thus arranged one on another is defined by the thickness of the spacers 92a. Due to such distance, a plurality of disk receiving slits S are formed between the individual partition plates 92. An inner face of each of the spacers 92a thus serves as a guide face 92e for guiding on either side portion of a disk being inserted. In the disk cartridge C shown in FIG. 11, up to six such disk receiving slits S are defined so that up to six disks, compact disks here, may be accommodated in the cartridge C.

The disk cartridge C further includes a pair of spring plates 93 each having up to six resilient fingers 93a disposed level with the individual disk receiving slits S of the cartridge C. Each of the resilient fingers 93a of the spring plates 93 is substantially V-shaped in plan and has a pressing piece 93b extending from a base portion of the spring plate 93 for pressing a disk in its discharging direction and another pressing piece 93c extending laterally from the other end of the pressing piece 93b for pressing a disk in its insertion direction. Each of the partition plates 92 has a pair of substantially triangular holes 92d formed at substantially central portions of the opposite side portions thereof, and where the partition plates 92 are assembled in an accumulated condition, the holes 92d thereof form a pair of accommodating chambers. The spring plates 93 mentioned above are thus accommodated in the accommodating chambers with the opposite ends thereof engaged with an upper plate of the body case 90 and the bottom plate 91 in a restricted condition. In other words, the spring plates 93 are installed in position within the cartridge C without the necessity of a fixing means such as a screw. It is to be noted that, while in the disk cartridge C shown in FIG. 11 the accommodating chambers are constituted from the holes 92d formed in the partition plates 92, the holes 92d may be replaced by recesses which are formed on the opposite sides of the partition plates 92 and cooperate with inner faces of the side plates of the body case 90 to define similar accommodating chambers.

A recess 96a is formed at an end portion of the inclined face 96 of the body case 90, and a support shaft 95 is provided at a location of the recess 96a of the body case 90. Up to six ejectors 94 formed from a synthetic resin material are supported at one end portion thereof for pivotal motion around the support shaft 95. Each of the ejectors 94 has an outer edge 94c extending substantially along an outer face of the adjacent side wall and the inclined face 96 of the body case 90. The outer edge 94c of each ejector 94 serves as a pressure receiving portion and has a serrated portion 94b thereon. Meanwhile a pressing projection 94a is provided at an inner edge 94d of each ejector 94, that is, at an edge portion directed inwardly of the body case 90. Further, a stopping projection 94e is formed at an end portion of each ejector 94 adjacent the support shaft 95 and is opposed to an edge face 90g of the side plate of the body case 90 adjacent to the ejectors 94. Referring to FIG. 12, pivotal motion of the ejectors 94 in the clockwise direction is restricted by the stopping projections 94e of the ejectors 94 and the edge face 90g of the side plate of the body case 90 opposed to the stopping projections 94e while pivotal motion in the counterclockwise direction is not restricted. If one of the ejectors 94 is pushed at the pressure receiving portion provided by the outer edge 94c thereof, then it is pivoted in the counter-clockwise direction in FIG. 12 so that a disk in the corresponding disk receiving slit S is pushed at a rear end thereof by the pressing projection 94a of the ejector 94 and thus discharged from the disk cartridge C.

Referring back to FIG. 11, the body case 90 has a window formed in a side plate thereof opposite to the side plate in which the recess 96a in which the ejectors 94 are located, and a transparent cover 99 is securely mounted in the window of the body case 90. The transparent cover 99 is convex at its outer side thereof so that it functions as a magnifying lens. The transparent cover 99, however, need not necessarily serve as a convex lens but may have the form of a flattened plate. Thus, disks accommodated in the cartridge C can be visually observed through the transparent cover 99. Accordingly, it can be immediately observed how many disks are accommodated in the cartridge C or in which slit or slits S a disk or disks are accommodated. Particularly in the case of the disk cartridge C shown in FIG. 11, since the recess 96a in which the ejectors 94 are located is at a location opposite to the window in which the transparent cover 99 is mounted, after the disk cartridge C is taken out from the disk changer, a disk or disks in the cartridge C can be observed clearly through the transparent cover 99 by external light admitted into the cartridge C through the recess 96a.

Six disk supporting grooves 90e and 90f are formed on an inner face at the rear end of the body case 90 remote from the inserting/discharging opening Ca of the body case 90, so that disks inserted in the disk receiving slits S may be individually supported in the supporting grooves 90e and 90f.

As described above, as the inclined face 96 is formed on the body case 90 of the cartridge C and the outer edges 94c of the ejectors 94 extend along the inclined face 96 and serve as the pressure receiving portions, the disk pressing piece 25b of the disk discharging member 25 can be disposed at a location at which it is opposed to the inclined face 96 of the body case 90 as seen in FIG. 12, and the spacing on the left side of the body case 90 in FIG. 12 can be saved. Further, a disk DS can be discharged only by linear rightward movement of the disk pressing piece 25b in FIG. 12. Accordingly, the operating direction of the disk discharging mechanism can be set in a longitudinal or widthwise direction of the disk changer.

Operation of the disk changer having a construction as described above is described below.

A disk cartridge C which has a plurality of disks DS accommodated in the slits S thereof is loaded in position into the cartridge loading section D in the unit Y.

Thereupon, when the cartridge C is pushed into the cartridge loading section D, the guideway 91a (refer to FIG. 11) formed in the bottom cover 91 of the cartridge C is guided by the guide pins 1 (FIG. 3) on the cartridge table 30 while the opposite side portions of the lower end of the cartridge C are guided by the guide walls 30a and 30b on the opposite edges of the cartridge table 30. During such insertion of the cartridge C, the leading end thereof abuts the pressing lug 6c of the second sliding lever 6 which extends upwardly from the recess 30d of the cartridge table 30 as shown in FIG. 2, and due to continued insertion of the cartridge C, the second sliding lever 6 is pushed to move in the direction indicated by the arrow mark m in FIG. 3 by the cartridge C. Upon such movement of the second sliding lever 6 in the direction of the arrow mark m, the first sliding lever 4 which is connected to the second sliding lever 6 by way of the tension coil spring 7 is moved in the same direction together with the second sliding lever 6. Meanwhile, the first driving pin 112a on the eject lever 11 is pushed by the first pressure receiving lug 4f formed on the second sliding lever 4 so that the eject lever 11 is pivoted in the counterclockwise direction in FIG. 3. After the first sliding lever 4 and the second sliding lever 6 connected to the first sliding lever 4 by way of the spring 7 are pushed to move a predetermined distance in the direction indicated by the arrow mark m by the cartridge C being inserted, the pressing portion 4d formed on the first sliding lever 4 is disengaged from the driving piece 2c of the locking member 2. Consequently, the locking member 2 is pivoted in the counterclockwise direction in FIG. 3 by the force of the coil spring 3 to project the locking projection 2b thereof upwardly from the cartridge table 30. Thereupon, the locking projection 2b is fitted into the locking hole 91b formed in the bottom cover 91 of the cartridge C. Consequently, the cartridge C is locked in position in the cartridge loading section D. Meanwhile, since the inclined guide 4e of the first sliding lever 4 abuts the driving piece 2c of the locking member 2, the first sliding lever 4 is locked by the locking member 2 so that it may not be returned in the direction of the arrow mark 1 by the force of the spring 8. It is to be noted that, in case the cartridge C is pushed in by a strong force, the force acts upon the second sliding lever 6, but in this instance, the spring 7 interconnecting the first sliding lever 4 and the second sliding lever 6 is expanded to absorb the force.

The disk cartridge C thus loaded in position is oriented such that the disk discharging opening thereof is opposed to the disk playing section E.

A description follows of the playing operation of the apparatus.

When a desired disk within the disk cartridge C is to be played, first a searching operation for the disk is performed. The searching operation is performed by rotating the lifting screws 52 of the individual lifting mechanisms 50 in a synchronized relationship by means of the driving mechanism (not shown) located below the bottom plate 34 of the unit Y. Rotation of the individual lifting screws 52 thus moves the lifting section 60 shown in FIG. 4 upwardly or downwardly within the unit Y. The driving mechanism located below the bottom plate 34 detects an amount of its movement by means of a sensor (not shown). Consequently, the current vertical position of the lifting section 60 is determined by a detecting operation of the sensor. As the vertical position of the lifting section 60 is determined in this manner, the lifting section 60 is moved to a position at which it is opposed to a desired one of the slits S of the cartridge C. In such a condition wherein a searching operation is completed as shown in FIG. 7, the lifting section 60 is stopped at a predetermined vertical position at which the drawing-out rollers 66 and 69 located on the lifting section 60 are opposed forwardly to the desired slit S of the cartridge C. Conversely, the disk pressing piece 25b of the disk discharging member 25 located on the lifting section 60 is opposed to one of the ejectors 94 of the disk cartridge C which is opposed to the slit S to which the drawing-out rollers 66 and 69 are opposed, as shown in FIG. 12.

Figure 13A:
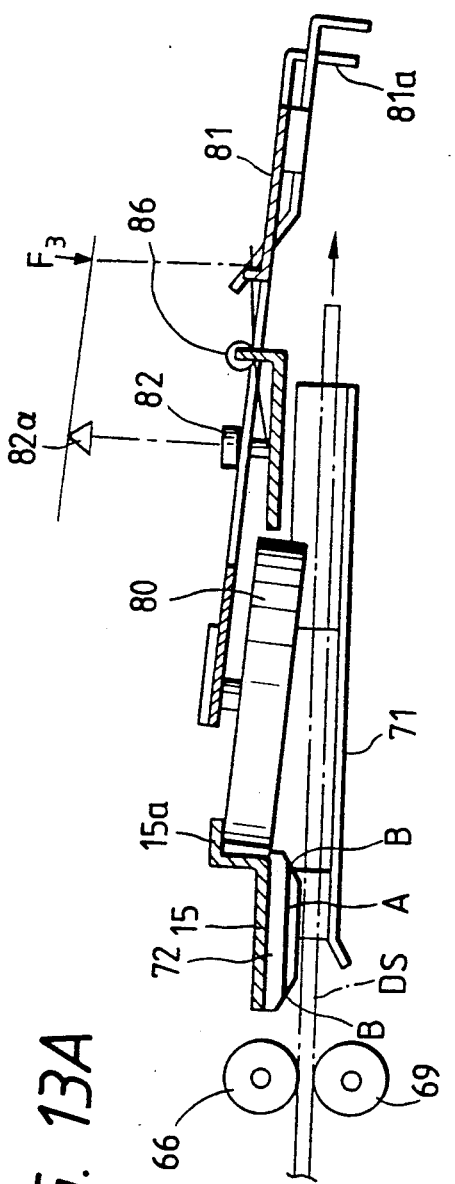
FIG. 13A and 13B are sectional views illustrating a guiding operation of a disk guide and operation of a disk clamping device.

In this condition, the motor M located on the lifting section 60 is started. In this instance, the pinion 14 is driven to rotate in the direction indicted by an arrow mark i in FIG. 6 by the motor M, and the roller driving gear 65 is rotated by the pinion 14 by way of the reduction gear train 64 to rotate the upper drawing-out roller 66 in the direction indicated by an arrow mark g. Simultaneously, the driving force of the pinion 14 is transmitted also to the large diameter gear 11b to rotate the driving gear 11 integral with the large diameter gear 11b in the direction indicated by an arrow mark b. In this instance, since the driving gear 11 in the power converting device 10 is rotated in the direction of the arrow mark b from the condition shown in FIG. 5B, the change-over lever 16 is pivoted following the driving gear 11 whereupon the pressure receiving projection 20b on the change-over gear 18 is pushed by the arm 16a of the change-over lever 16 until the driving gear 11 is brought into meshing engagement with the teeth 18a of the change-over gear 18. Consequently, the change-over gear 18 is rotated to such a position as shown in FIG. 5A, the end point B1 of the teeth 18a of the change-over gear 18 is brought out of engagement with the driving gear 11, thereby interrupting transmission of the power. By such rotation of the change-over gear 18 until then, a driving pin 21 thereon moves the disk discharging member 25 back and forth. At a stroke of the disk discharging member 25 in the direction indicated by an arrow mark f then, the disk pressing piece 25b of the disk discharging member 25 pushes an opposing one of the ejectors 94 shown in FIG. 12. The corresponding disk DS is thus discharged out of the cartridge C by pivotal motion of the ejector 94. In this instance, since the upper drawing-out roller 66 located on the lifting section 60 is being rotated in the direction indicated by the arrow mark g in FIG. 6, the disk DS discharged from the cartridge C is pressed between the drawing-out rollers 66 and 69 and is thus fed into the support table 71 in the lifting section 60 by the turning force of the upper drawing-out roller 66. After the disk DS is received fully into the lifting section 60, the motor M is stopped. In this instance, the clamp arm 81 is in a spaced position from the clamper supporting member 43 located on the disk drive unit 40. Accordingly, the clamp arm 81 is supported only by the support pins 82 provided on the lifting chassis 85 as shown in FIG. 13A. Meanwhile, the arm 86a of the spring 86 provided on the lifting chassis 85 presses the clamp arm 81 downwardly in FIG. 13A with the force indicated at F3 at an outer location with respect to the clamper 80 from the first fulcrum (indicated at 82α in a diagrammatic representation) provided by the support pins 82. Accordingly, the clamp arm 81 is at its clockwise pivoted position due to the relationship of the first fulcrum 82 (or 82α in the diagrammatic representation) and the force F3. The clamper 80 provided at the end of the clamp arm 81 in this condition abuts the stopper lug 85a provided on the lifting chassis 85 and is thus attracted to the stopper lug 85a by the magnet (not shown) mounted in the clamper 80. In this manner, when the lifting section 60 is at its lifted position, the clamper 80 is also at its lifted position. Accordingly, the clamper 80 is positioned above a passage of the disk DS drawn out by the drawing-out rollers 66 and 69.

Figure 8:
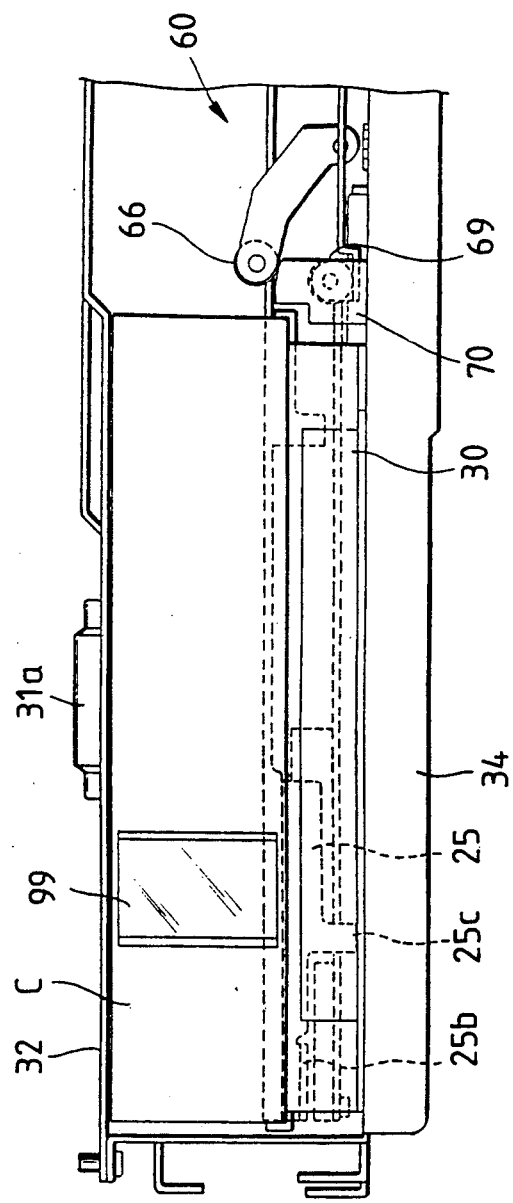
Figure 13B:
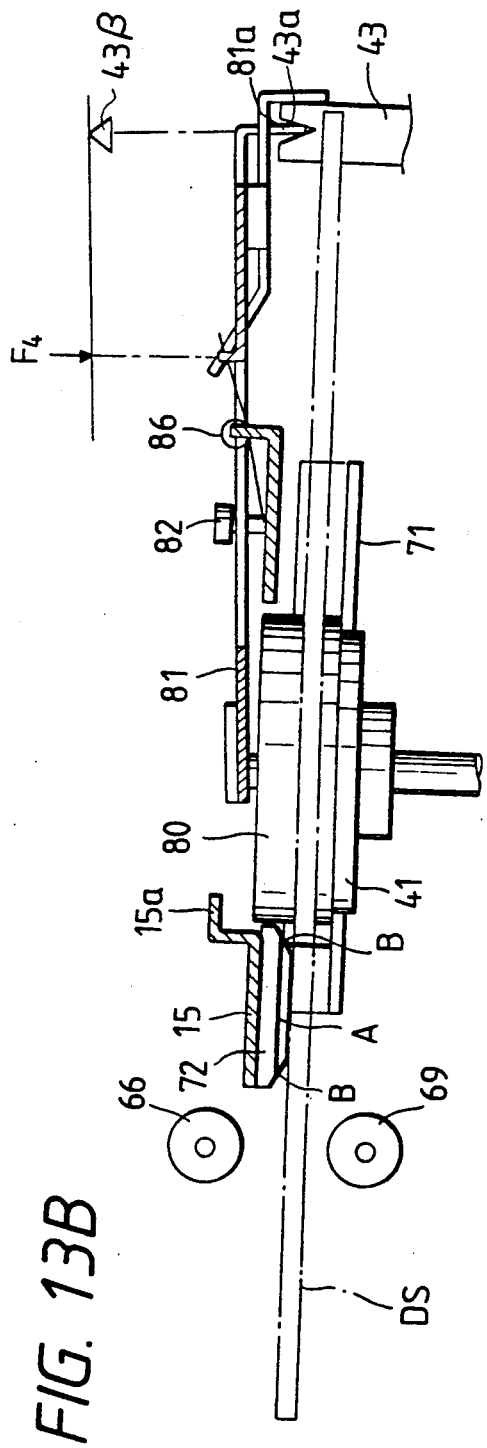

After the disk DS is drawn into the lifting section 60, the lifting mechanisms 50 are rendered operative so that the lifting section 60 is moved down to its lowermost position shown in FIG. 8. Then, the disk DS carried in the lifting section 60 is placed onto the turntable 41 of the disk drive unit 40. Thereupon, the supporting lugs 81a provided at the rear end of the clamp arm 81 are received by the V-shaped recesses 43a of the clamper supporting members 43 provided on the disk drive unit 40. In this condition, at first the clamper 81 is positioned by the V-shaped recesses 43a of the clamper supporting members 43. As the lifting section 60 is further moved down, the supporting pins 82 which provide the first fulcrum are spaced from the clamp arm 81 as seen in FIG. 13B. Finally, the clamp arm 81 is supported only by the V-shaped recesses 43a of the clamper supporting members 43. Thus, the clamp arm 41 is brought into a condition wherein it is supported by the second fulcrum provided by the V-shaped recesses 43a of the clamper supporting members 43 as shown in a diagrammatic representation in FIG. 13B in which the second fulcrum is denoted at 43β. In this condition, the arm 86a of the spring 86 presses the clamp arm 81 downwardly with a force F4 at a location nearer to the clamper 80 than the second fulcrum. Accordingly, the clamp arm 81 is pivoted in a counterclockwise direction around the second fulcrum by the force F4 so that the clamper 80 presses the disk DS against the turntable 41. In this instance, the clamper 80 presses the disk DS against the turntable 41 with both the spring pressure and the magnetic attracting force of the magnet therein. While the disk DS is in the clamped condition, the upper drawing-out roller 66 remains at its lifted position above the disk DS by the roller restricting tabs 70. Meanwhile, the lower drawing-out roller 69 and the disk supporting table 71 are located below the disk DS. The disk DS is driven to rotate by the turntable 41 in this condition, and the reading (playing) operation is performed by the optical pickup 42.

The operation of returning the disk DS into the cartridge C after completion of playing thereof is as follows.

After completion of playing of the disk DS by the disk drive unit 40, the lifting section 60 is lifted and the disk DS is moved up by the lower drawing-out roller 69 and the supporting table 71. On the way, the upper drawing-out roller 66 is spaced from the roller restricting tabs 70 so that the disk DS is pressed between the rollers 66 and 69. After the lifting section 60 is moved up to and stopped at the position opposite to the predetermined slit S of the cartridge C from which the disk DS was drawn out, the motor M within the lifting section 60 is started. In this instance, the pinion 14 is driven to rotate in the direction indicated by the arrow mark g in FIG. 6 by the motor M. Consequently, the upper drawing-out roller 66 is rotated in the direction indicated by the arrow mark i so that the disk DS is fed from the lifting section 60 back into the slit S of the cartridge C. When the disk DS is pushed by a particular distance into the slit S as seen in FIG. 12, the force of the spring plates 93 acting on the disk DS is reversed so that the disk DS is automatically pushed into the interior of the slit S by the spring plates 93. During such operation of returning the disk DS, the driving gear 11 of the power converting device 10 is driven to rotate in the clockwise direction indicated by the arrow mark a from the condition shown in FIG. 5A so that the change-over gear 18 is rotated in the counterclockwise direction indicated by the arrow mark b to such a condition as shown in FIG. 5B. During such rotation of the change-over gear 18, the disk discharging member 25 is moved back and forth by the driving pin 21 on the change-over gear 18 whereupon the disk pressing piece 25b of the disk discharging member 25 pushes the ejector 94 of the cartridge C inwardly into the body case 90 of the cartridge C. This, however, will not interfere with the returning movement of the disk DS because the disk discharging member 25 is returned in the direction indicated by the arrow mark e before the disk DS is returned fully into the cartridge C.

The ejecting operation of the cartridge is as follows.

When the cartridge C is to be discharged from the cartridge loading section D, the lifting section 60 is lowered to its lowermost position shown in FIG. 8. The lowermost position then is the same as the lowered position of the lifting section 60 for playing of the disk DS described hereinabove. At the lowermost position of the lifting section 60 shown in FIG. 8, the disk pressing piece 25b provided at the rear end of the disk discharging member 25 is positioned below the cartridge C, that is, below the cartridge table 30. Consequently, the ejecting driving projection 25c formed on the disk discharging member 25 is opposed to the driven arm 11a of the ejector 111.

When an operation for discharging of the cartridge DS is performed, the motor M within the lifting section 60 is started. Consequently, the disk discharging member 25 is moved back and forth by the power converting device 10 similarly as in the discharging operation of the disk DS from the cartridge C described hereinabove. In this instance, however, since the disk pressing piece 25b of the disk discharging member 25 is positioned below the cartridge C, it will move below the cartridge C and accordingly no ejector 94 of the cartridge C will be pushed by the disk pressing piece 25b. When the disk discharging member 25 is moved in the direction indicated by the arrow mark f in this manner, the first pressure receiving lug 4f of the first sliding lever 4 is pushed by the first driving pin 112a of the eject lever 111 so that the first sliding lever 4 is moved in the direction indicated by the arrow mark 1 as shown in FIG. 9A. Since the distance L1 between the center pivotal portion of the eject lever 111 (that is, the shaft 113) and the point of application of force to the eject lever 111 (that is, the first driving pin 112a) is small, a large pushing force F1 acts upon the first sliding lever 4. The inclined guide 4e provided on the first sliding lever 4 is thus caused to ride over the driving piece 2c of the locking member 2 by the pushing force so that the driving piece 2c is subsequently pushed downwardly by the pressing piece 4d of the first sliding lever 4. Consequently, the locking member 2 is pivoted in the clockwise direction in FIG. 3 so that the locking projection 2b thereon is retracted downwardly from the cartridge table 30 thereby to cancel the locked condition of the disk cartridge C. Further, the first sliding lever 4 is pushed in the direction indicated by the arrow mark 1 together with the second sliding lever 6 with the pushing force F1 and the force of the spring 8 whereupon the cartridge C is discharged by the pressing lug 6c of the second sliding lever 6. However, since the eject lever 111 is pivoted to a great extent in the clockwise direction by the movement of the cartridge discharging member 25 in the direction indicated by the arrow mark f as shown in FIG. 9B, the second driving pin 112b of the eject lever 111 abuts with the second pressure receiving lug 4g of the first sliding lever 4 to push out the first sliding lever 5 in the direction indicated by the arrow mark 1 with a force F2. Since the point of application of the force F2 then is spaced by a greater distance from the center 113 of pivot position of the eject lever 111 than the distance L1 of the point of application of the force F1, the force F2 is smaller than the force F1. Since a large force is required when the locking member 2 is to be retracted by the inclined guide 4e of the first sliding lever 4, the first sliding lever 4 is moved by the great force F1 then, but after the locked condition by the locking member 2 is cancelled, the first sliding lever 4 is moved by the small force F2. Since the first sliding lever 4 is pushed out to its last position in the direction indicated by the arrow mark 1 by the driving pin 112b provided on the eject lever 111 in this manner, it can be discharged with certainty.

The above description of the invention is illustrative and not limiting. Other embodiments of the invention will be apparent to one of ordinary skill in the art in light of the invention.

What is claimed is:

1. A disk cartridge for use with a disk changer, comprising:
   a case in which a plurality of disk receiving slits for receiving disks therein are formed, said disk receiving slits extending between a pair of corners of said case, and wherein an ejector opening is formed at a third corner of said case, said third corner being at a remote location from said pair of corners;
   an insertion/discharging opening formed in said case for admitting or discharging a disk into or from said case;
   spring means for retaining disks received in said disk receiving slits individually in accommodated positions; and
   a plurality of ejectors individually provided for said disk receiving slits at a portion of said case remote from said insertion/discharging opening, each of said ejectors supported at a pivot support portion thereof for individual pivotal motion around a shaft for pushing out a disk from within a corresponding one of said disk receiving slits toward said insertion/discharging opening, each of said ejectors having a pressure receiving portion on an outer edge of said ejector which extends along said ejector opening of said case, each of said ejectors further having a pressing portion formed on an inner edge of said ejector that is positioned within said case for pushing a disk received in a corresponding one of said disk receiving slits toward said insertion/discharging opening.

2. A disk cartridge for use with a disk changer according to claim 1, wherein said spring means urges, after a disk received in said case is pushed to move to a predetermined position toward said insertion/discharging opening, the disk in a direction to be discharged from said case.

3. A disk cartridge for use with a disk changer according to claim 1, wherein said disk receiving slits are defined by a plurality of partition plates fitted one on another in said case.

4. A disk cartridge for use with a disk changer according to claim 3, wherein each of said partition plates has at least two opposite sides and a central portion at a position intermediate said opposite sides, and wherein each of said partition plates has a pair of spacers provided at the opposite sides thereof for providing a predetermined distance between each adjacent ones of said partition plates at said central portions thereof.

5. A disk cartridge for use with a disk changer according to claim 1, further comprising:
- a plurality of partition plates for defining said disk receiving slits, each of said partition plates having two opposite sides;
- a pair of spacers formed in an integral relationship on the opposite sides of each of said partition plates for assuring a distance between each adjacent ones of said partition plates, the pairs of spacers being placed one on another in said case to cause said partition plates to define said disk receiving slits therebetween; and
- wherein said spring means includes a pair of spring plates located in said case at locations adjacent to the opposite side portions of disks to be inserted into or discharged from said disk receiving slits, each of said spring plates having formed thereon a pressing portion for pressing a disk in its insertion direction and another pressing portion for pressing a disk in its discharging direction, each of said spring plates being fitted in holes or recesses formed in said individual partition plates.

6. A disk player with an integrated disk changer, comprising a motor and a power converting device driven by the motor, said power converting device including:
- a driving gear connected to be rotated by said motor;
- a change-over lever disposed coaxially and in frictional engagement with said driving gear to pivot within a limited angular range in response to rotation of said driving gear;
- a change-over gear disposed for meshing engagement with said driving gear, said change-over gear having a series of teeth formed over a predetermined angular range on an outer periphery thereof, said change-over gear further having a pair of pressure receiving projections provided at such locations thereon so that, when an end of said series of teeth is brought out of meshing engagement with said driving gear, either one of said pressure receiving projections may be opposed to said change-over lever, and wherein said change-over lever abuts either one of said pressure receiving projections to rotate said change-over gear so that said series of teeth is brought into meshing engagement with said driving gear, and wherein each of said pair of pressure receiving projections includes a pin implanted on said change-over gear;
- a cartridge loading section into which a disk cartridge in which a plurality of disks are accommodated is to be inserted;
- a disk drawing-out mechanism located in an opposing relationship to a disk discharging opening of said disk cartridge inserted in position in said cartridge loading section for drawing out a disk from within the cartridge; and
- a disk discharging member connected to be linearly moved back and forth by said change-over gear of said power converting device to push out a disk within the disk cartridge to said disk drawing-out mechanism.

7. A disk player with an integrated disk changer, comprising:
- a cartridge loading section into which a disk cartridge in which a plurality of disks are accommodated is to be inserted;
- a lifting section disposed for movement along a disk discharging opening of a disk cartridge loaded in position on said cartridge loading section, said lifting section having a mechanism for drawing out a disk from within a disk cartridge loaded in position on said disk cartridge loading section and having a clamper and a clamp arm which supports a center shaft of said clamper thereon;
- a turntable located at a lowered position of said lifting section for driving a disk thereon to rotate;
- a pickup located at the lowered position of said lifting section for picking up information recorded on a disk on said turntable;
- a first fulcrum provided on said lifting chassis for supporting said clamp arm for rocking motion with respect to said lifting chassis when said lifting section is at its lifted position;
- a second fulcrum for supporting said clamp arm for rocking motion at a position spaced farther from said clamper than said first fulcrum when said lifting section is at its lowered position; and
- a spring for urging said clamp arm toward said turntable at an intermediate position between said first fulcrum and said second fulcrum.

8. A disk player with an integrated disk changer according to claim 7, wherein said second fulcrum is provided by a clamp supporting member integral with a disk drive unit on which said turntable is supported.

9. A disk player with an integrated disk changer according to claim 8, wherein a V-shaped recess for supporting said clamp arm thereon is provided on said clamp supporting member.

10. A disk player with an integrated disk changer, comprising:
- a cartridge loading section into which a disk cartridge in which a plurality of disks are accommodated is to be inserted;
- a disk drawing-out mechanism located in an opposing relationship to a disk discharging opening of a disk cartridge inserted in position in said cartridge loading section for drawing out a disk from within the cartridge;
- a disk discharging member disposed for movement in a disk pushing out direction and also for movement along the disk discharging opening of a cartridge loaded in position in said cartridge loading section to be positioned adjacent a selected disk, said disk discharging member having a disk pressing portion for pushing out a disk within a disk cartridge inserted in position in said cartridge loading section to said disk drawing out mechanism;
- a cartridge table located on said cartridge loading section for receiving a cartridge on a face thereof;
- an ejecting mechanism located on said cartridge loading section below said cartridge table for discharging a cartridge from said cartridge loading section; and
- an eject driving section provided on said disk discharging member for driving said ejecting mechanism when said disk discharging member is moved to a position at which said disk pressing portion thereof passes below the height position of the cartridge, said eject driving section being driven by said disk discharging member.

11. A disk player with an integrated disk changer comprising:
- a cartridge loading section into which a disk cartridge in which a plurality of disks are accommodated is to be inserted;
- a disk feeding mechanism for selectively taking out one of the disks within a disk cartridge loaded in position in said disk loading section and for introducing the disk to a disk playing section;
- a cartridge table located on said cartridge loading section for guiding a cartridge;
- a locking member mounted for movement on said cartridge table and urged in a direction to fit into a locking recess formed in a disk cartridge loaded in position in said cartridge loading section;
- a sliding lever mounted on said cartridge table such that, when a disk cartridge is to be inserted into said disk loading section, said sliding lever may be pushed by the cartridge to move toward the interior of said cartridge loading section;
- a spring for urging said sliding lever toward a cartridge insertion opening of said cartridge loading section; and
- an eject lever connected to pivot in response to a discharging operation of a disk cartridge;
    - said sliding lever having a pressing portion for retracting said locking member from the locking recess of a cartridge loaded in position in said disk loading section when the cartridge is to be moved toward said cartridge insertion opening of said cartridge loading section, said sliding lever and said ejecting lever having a first pressing engaging means for pushing said sliding lever toward said insertion opening to a first stroke when said eject lever is pivoted in response to a discharging operation of a disk cartridge and a second pressing engaging means for pushing said sliding lever toward said insertion opening after then.

12. A disk player with an integrated disk changer according to claim 11, wherein said sliding lever includes a first sliding lever having a pressing portion formed thereon for pressing against said locking member, and a second sliding lever having a pressing piece formed thereon for being pushed by a disk cartridge.

13. A disk player with an integrated disk changer according to claim 12, wherein said first and second sliding levers are interconnected by a means for providing tension.

14. A disk player with an integrated disk changer according to claim 12, wherein said pressing piece provided on said second sliding lever is operable to push out a disk cartridge from said cartridge loading section.

15. A disk player with an integrated disk changer according to claim 12, wherein said sliding lever is pushed by said eject lever, and such pressing force is transmitted to said second sliding lever to discharge a disk cartridge from said cartridge loading section.

* * * * *